(12) United States Patent
O'Neal et al.

(10) Patent No.: US 11,511,992 B2
(45) Date of Patent: *Nov. 29, 2022

(54) HYDROGEN PRODUCTION WITH INTEGRATED $CO_2$ CAPTURE

(71) Applicant: ExxonMobil Research and Engineering Company, Annandale, NJ (US)

(72) Inventors: Everett J. O'Neal, Asbury, NJ (US); Anastasios I. Skoulidas, Pittstown, NJ (US); Zhiyan Wang, The Woodlands, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 289 days.

This patent is subject to a terminal disclaimer.

(21) Appl. No.: 16/838,856

(22) Filed: Apr. 2, 2020

(65) Prior Publication Data
US 2020/0331751 A1   Oct. 22, 2020

Related U.S. Application Data

(60) Provisional application No. 62/829,793, filed on Apr. 5, 2019.

(51) Int. Cl.
*C01B 3/38* (2006.01)
*B01J 8/04* (2006.01)
(Continued)

(52) U.S. Cl.
CPC ............ *C01B 3/384* (2013.01); *B01D 53/047* (2013.01); *B01J 8/0492* (2013.01); *B01J 8/0496* (2013.01);
(Continued)

(58) Field of Classification Search
CPC .. C01B 3/384; C01B 3/40; C01B 3/48; C01B 3/56; C01B 2203/0233; C01B 2203/0283;
(Continued)

(56) References Cited

U.S. PATENT DOCUMENTS 7,491,250 B2   2/2009   Hershkowitz et al.
7,740,289 B2   6/2010   Tang
(Continued)

OTHER PUBLICATIONS

The International Search Report and Written Opinion for PCT/US2020/026439 dated Jun. 23, 2020.

*Primary Examiner* — Steven J Bos
*Assistant Examiner* — Syed T Iqbal
(74) *Attorney, Agent, or Firm* — Liza Negron

(57) ABSTRACT

Systems and methods are provided for performing hydrocarbon reforming within a reverse flow reactor environment (or another reactor environment with flows in opposing directions) while improving management of $CO_2$ generated during operation of the reactor. The improved management of $CO_2$ is achieved by making one or more changes to the operation of the reverse flow reactor. The changes can include using an air separation unit to provide an oxygen source with a reduced or minimized content of nitrogen and/or operating the reactor at elevated pressure during the regeneration stage. By operating the regeneration at elevated pressure, a regeneration flue gas can be generated that is enriched in $CO_2$ at elevated pressure. The $CO_2$-enriched stream can include primarily water as a contaminant, which can be removed by cooling while substantially maintaining the pressure of the stream. This can facilitate subsequent recovery and use of the $CO_2$.

18 Claims, 6 Drawing Sheets

(51) Int. Cl.
*B01D 53/047* (2006.01)
*B01J 19/24* (2006.01)
*B01J 38/40* (2006.01)
*C01B 3/48* (2006.01)
*C01B 3/56* (2006.01)
*B01J 12/00* (2006.01)
*B01J 23/34* (2006.01)
*B01J 23/92* (2006.01)
*B01J 35/04* (2006.01)
*B01J 38/14* (2006.01)
*C01B 3/40* (2006.01)

(52) U.S. Cl.
CPC ......... *B01J 12/007* (2013.01); *B01J 19/2465* (2013.01); *B01J 23/34* (2013.01); *B01J 23/92* (2013.01); *B01J 35/04* (2013.01); *B01J 38/14* (2013.01); *B01J 38/40* (2013.01); *C01B 3/40* (2013.01); *C01B 3/48* (2013.01); *C01B 3/56* (2013.01); *B01D 2256/16* (2013.01); *B01D 2257/502* (2013.01); *B01D 2257/504* (2013.01); *B01D 2257/80* (2013.01); *C01B 2203/0233* (2013.01); *C01B 2203/0283* (2013.01); *C01B 2203/042* (2013.01); *C01B 2203/0475* (2013.01); *C01B 2203/0822* (2013.01); *C01B 2203/1094* (2013.01); *C01B 2203/1241* (2013.01)

(58) Field of Classification Search
CPC ...... C01B 2203/042; C01B 2203/0475; C01B 2203/0822; C01B 2203/1094; C01B 2203/1241; C01B 2203/043; C01B 2203/0827; C01B 2203/1023; C01B 2203/1047; C01B 2203/1058; C01B 2203/1076; C01B 2203/1082; C01B 3/46; B01D 53/047; B01D 2256/16; B01D 2257/502; B01D 2257/504; B01D 2257/80; B01J 8/0492; B01J 8/0496; B01J 12/007; B01J 19/2465; B01J 23/34; B01J 23/92; B01J 35/04; B01J 38/14; B01J 38/40; Y02C 20/40; Y02P 30/00
See application file for complete search history.

(56) References Cited

U.S. PATENT DOCUMENTS

| | | |
|---|---|---|
| 7,740,829 B2 | 6/2010 | Becker et al. |
| 7,815,873 B2 | 10/2010 | Sankaranarayanan et al. |
| 8,754,276 B2 | 6/2014 | Buchanan et al. |
| 2004/0170558 A1 | 9/2004 | Hershkowitz et al. |
| 2004/0170559 A1 | 9/2004 | Hershkowitz et al. |
| 2004/0180973 A1 | 9/2004 | Hershkowitz et al. |
| 2011/0000671 A1* | 1/2011 | Hershkowitz ............. C01B 3/38 166/305.1 |
| 2011/0008226 A1* | 1/2011 | Hershkowitz ............. B01J 8/04 422/600 |
| 2012/0111315 A1 | 5/2012 | Grenda et al. |

* cited by examiner

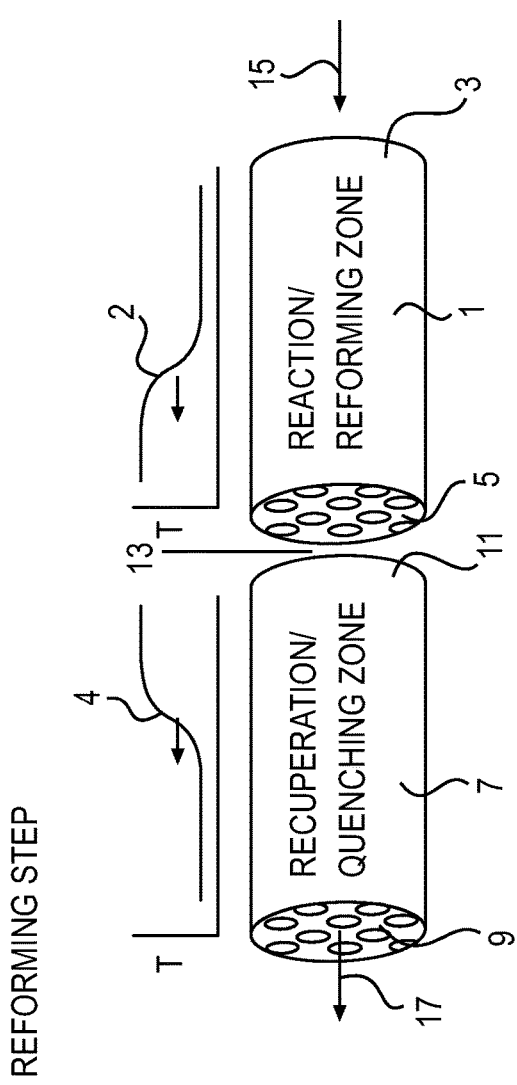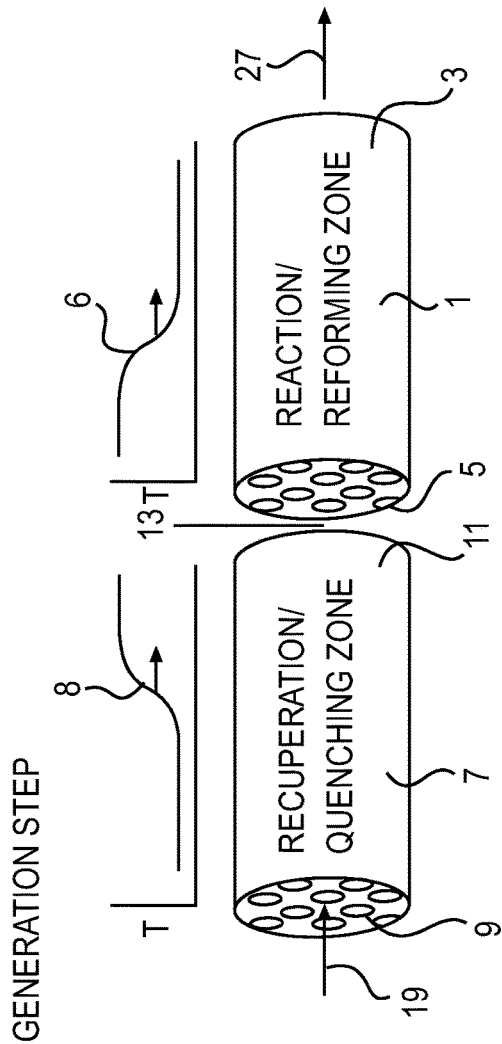

HYDROGEN PRODUCTION WITH INTEGRATED $CO_2$ CAPTURE

CROSS REFERENCE TO RELATED APPLICATIONS

This application claims priority to U.S. Provisional Application Ser. No. 62/829,793 filed Apr. 5, 2019, which is herein incorporated by reference in its entirety.

FIELD OF THE INVENTION

This invention relates to methods for capture of $CO_2$ generated during operation of reverse flow reactors.

BACKGROUND OF THE INVENTION

Reverse flow reactors are an example of a reactor type that is beneficial for use in processes with cyclic reaction conditions. For example, due to the endothermic nature of reforming reactions, additional heat needs to be introduced on a consistent basis into the reforming reaction environment. Reverse flow reactors can provide an efficient way to introduce heat into the reaction environment. After a portion of the reaction cycle used for reforming or another endothermic reaction, a second portion of the reaction cycle can be used for combustion or another exothermic reaction to add heat to the reaction environment in preparation for the next reforming step. U.S. Pat. Nos. 7,815,873 and 8,754,276 provide examples of using reverse flow reactors to perform various endothermic processes in a cyclic reaction environment.

One of the difficulties with reforming of hydrocarbons is that a substantial amount of $CO_2$ is also produced. In addition to the $CO_2$ generated by the reforming reaction, the substantial heat requirements for performing a reforming reaction are typically provided by combustion of additional hydrocarbons, resulting in generation of additional $CO_2$. Thus, it would be desirable to have systems and/or methods of reforming hydrocarbons that could mitigate the impact of this substantial $CO_2$ production.

U.S. Pat. No. 7,740,289 describes production of synthesis gas in a reverse flow reactor by steam reforming followed by incomplete combustion of remaining hydrocarbons at elevated temperature and pressure. In addition to providing additional synthesis gas, the incomplete combustion provides heat to the reactor. In the method described in U.S. Pat. No. 7,740,289, the reversal of flow is achieved by alternating the end of the reactor used for input of the reactant flows for performing the steam reforming and incomplete combustion. The resulting synthesis gas can then be used for production of methanol.

U.S. Patent Application Publication 2012/0111315 describes an in-situ vaporizer and recuperator that is suitable for use with an alternating flow system, such as a pressure swing reformer.

SUMMARY OF THE INVENTION

In an aspect, a method for performing reforming is provided. The method includes reacting a fuel mixture comprising a fuel stream, an oxygen-containing stream comprising 15 vol % or less $N_2$ relative to a volume of the oxygen-containing stream, and a recycle stream under combustion conditions comprising a combustion pressure of 0.7 MPa-g or more in a combustion zone within a reactor to form a flue gas and to heat one or more surfaces in a reaction zone to a regenerated surface temperature of 600° C. or more. The reaction zone can include a catalyst composition. The fuel mixture can include 0.1 vol % or more O2 and 20 vol % or more $CO_2$ relative to a volume of the fuel mixture. The method can further include separating the flue gas to form at least a $CO_2$-containing stream comprising a second pressure of 0.7 MPa-g or more and the recycle stream. Additionally, the method can include exposing a hydrocarbon-containing stream to the catalyst composition in the reaction zone at the regenerated surface temperature under reforming conditions to form a reforming product stream comprising $H_2$ and CO. A direction of flow for the hydrocarbon-containing stream within the reaction zone can be reversed relative to a direction of flow for the fuel mixture.

Optionally, the method can further include exposing the reforming product stream to water gas shift reaction conditions to form a shifted synthesis gas product stream. In such optional aspects, the method can further include separating the shifted synthesis gas product stream to form a $H_2$-containing stream and a stream comprising $CO_2$. For example, the shifted synthesis gas product stream can be separated by pressure swing adsorption. In such an aspect, the fuel mixture can optionally include at least a portion of the stream comprising $CO_2$. Optionally, the shifted synthesis gas stream can include a molar ratio of $H_2$ to CO of less than 10.

Optionally, at least one of the recycle stream and the fuel mixture can include 15 vol % or less of $N_2$. Optionally, the oxygen-containing stream can be formed separating air in an air separation unit.

In another aspect, a reverse flow reactor system is provided. The reverse flow reactor system includes a reactor comprising a reactor inlet end, a regenerator inlet end, and a reaction zone comprising reforming catalyst. The reverse flow reactor system can further include a recycle loop providing intermittent fluid communication between the reactor inlet end and the regenerator inlet, the recycle loop comprising a recycle compressor, a fuel source inlet, an oxygen-containing gas inlet, and a CO-containing gas outlet. The reverse flow reactor system can further include an air separation unit in fluid communication with the oxygen-containing gas inlet. Additionally, the reactor system can include a water separation stage in fluid communication with the $CO_2$-containing gas outlet.

Optionally, the reverse flow reactor system can further include a pressure swing adsorption separator including an adsorber inlet, a product outlet, and a tail gas outlet. In such an optional aspect, the regenerator inlet end can be in intermittent fluid communication with the adsorber inlet and the tail gas outlet can be in intermittent fluid communication with the recycle loop.

BRIEF DESCRIPTION OF THE DRAWINGS

FIG. 4 shows regeneration gas flow rates and corresponding temperature profile during the reaction cycle for steam reforming in a reverse flow reactor.

FIG. 6 schematically shows an example of operation of a reverse flow reactor.

FIG. 6A shows the reforming step of a reforming reaction.

FIG. 6B shows a regeneration step of a reforming reaction.

DETAILED DESCRIPTION OF THE EMBODIMENTS

Figure 1:
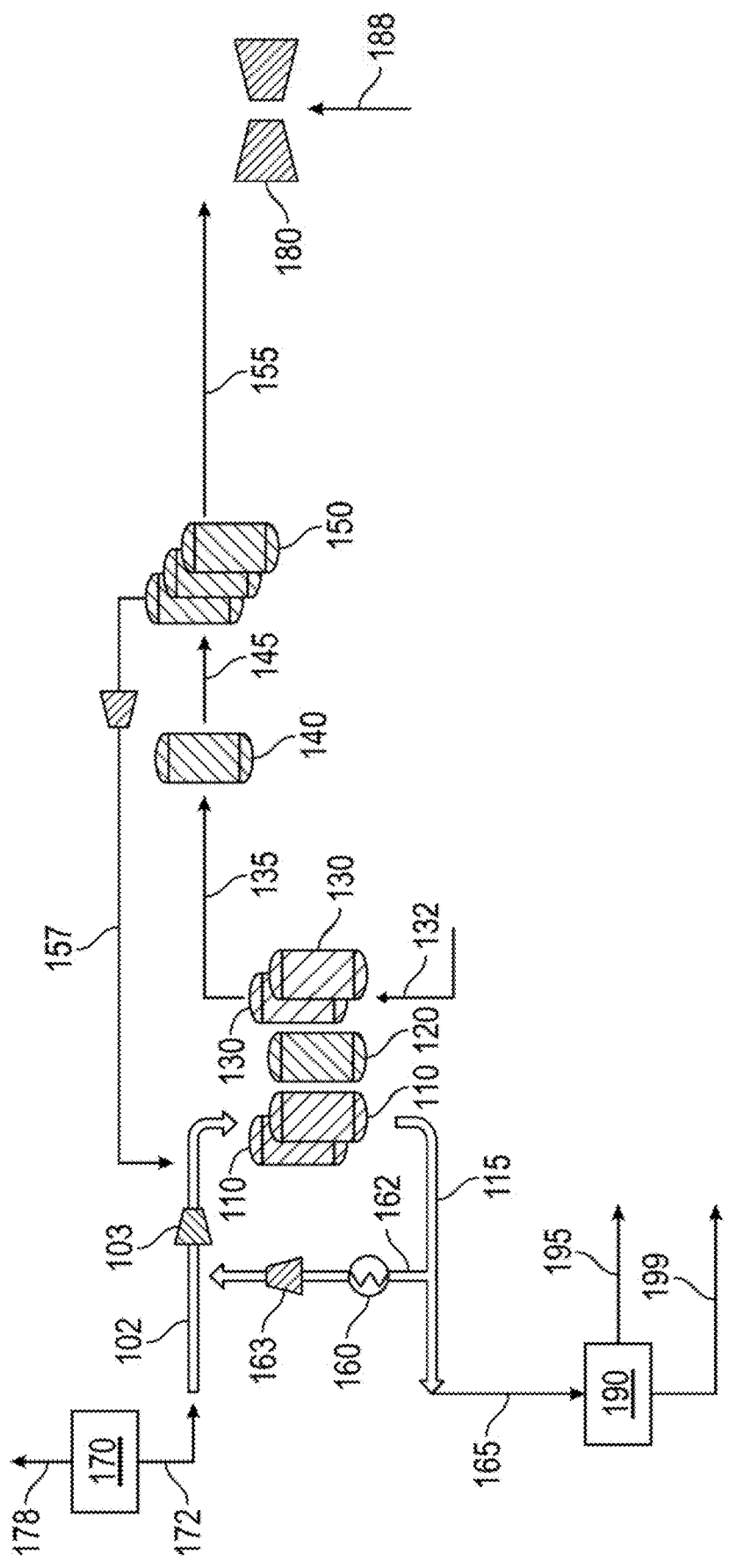
FIG. 1 shows an example of a configuration for using reverse flow reactors to perform hydrocarbon reforming while managing $CO_2$.

All numerical values within the detailed description and the claims herein are modified by "about" or "approximately" the indicated value, and take into account experimental error and variations that would be expected by a person having ordinary skill in the art.

Overview

In various aspects, systems and methods are provided for performing hydrocarbon reforming within a reverse flow reactor environment (or another reactor environment with flows in opposing directions) while improving management of $CO_2$ generated during operation of the reactor. The improved management of $CO_2$ is achieved by making one or more changes to the operation of the reverse flow reactor. One change can be to use an air separation unit to provide an oxygen source with a reduced or minimized content of nitrogen. This can increase the concentration of $CO_2$ in flue gas generated during regeneration of the reactor while reducing or minimizing the amount of diluent gases present in the flue gas. Another change can be to operate the reactor at elevated pressure during the regeneration stage. By operating the regeneration at elevated pressure, a regeneration flue gas can be generated that is enriched in $CO_2$ at elevated pressure. The $CO_2$-enriched stream can include primarily water as a contaminant, which can be removed by cooling while substantially maintaining the pressure of the stream. This can facilitate subsequent recovery and use of the $CO_2$. Still another change can involve using tail gas separated from the reforming product as part of the fuel for regeneration, so that the carbon oxides generated during reforming are also incorporated into the high pressure, $CO_2$-enriched flue gas stream. Yet another change can be to modify the operation of a water gas shift stage to reduce the amount of hydrogen produced in favor of additional production of CO. In terms of heat generated per oxygen combusted, the combustion of CO generates more heat than combustion of $CH_4$ or $H_2$. This can allow for a reduction of the size of the air separation unit.

Steam reforming provides a conventional method for reforming of methane and/or other hydrocarbons. During steam reforming, a hydrocarbon feed is reformed to produce $H_2$, CO, $CO_2$, and $H_2O$ under endothermic reaction conditions. The heat required for performing the steam reforming reaction is typically provided by additional combustion of hydrocarbons. As a result, one of the outcomes of the reforming reaction is production of a substantial amount of low pressure $CO_2$ due to the corresponding combustion reaction. Additionally, the low pressure $CO_2$ from the combustion reaction is typically dilute, due to use of air as the oxygen source for combustion. Because of the dilute nature of conventional combustion flue gas, it is generally not desirable to attempt to add the $CO_2$ from the reforming product to the flue gas. In particular, the reforming product typically includes only a minimal amount of nitrogen and/or other inerts. Thus, adding $CO_2$ separated from the reforming product to the flue gas would correspond to adding a concentrated $CO_2$ stream to a dilute $CO_2$ stream.

In contrast to conventional steam reforming, in various aspects, reforming can be performed in a reverse flow reactor so that substantially all of the $CO_2$ generated to provide heat for the reforming reaction can be accumulated in high pressure stream with a high $CO_2$ concentration. This high pressure, high concentration $CO_2$ stream can be generated by making a plurality of modifications to the operation of the reverse flow reactor.

In order to modify the operation of a reverse flow reactor to generate a high pressure, high concentration $CO_2$ stream, one modification can be to use an oxygen source other than air. During conventional operation of the regeneration step in a reverse flow reactor, the working fluid for transfer of heat includes a substantial quantity of nitrogen. This is due to the use of air as the oxygen source for combustion. Once this nitrogen is introduced for combustion, the nitrogen is recycled as part of the flue gas that is recycled to form the balance of the working fluid.

In contrast to conventional operation, in various aspects the nitrogen content of the working fluid during regeneration can be reduced or minimized by using a higher purity oxygen-containing stream to provide the oxidant for the combustion reaction. For example, an air separation unit can be used to generate an oxygen-containing stream with a reduced or minimized content of nitrogen. Reducing or minimizing the amount of nitrogen in the oxygen-containing stream provides a corresponding reduction in the nitrogen content of the combustion products.

Reducing the nitrogen content of the combustion products provides a second modification, in that the recycled flue gas used as the working fluid for transporting heat is also primarily composed of $CO_2$ and $H_2O$. Thus, by reducing or minimizing $N_2$ in the oxygen-containing gas, $N_2$ is reduced or minimized in any flue gas that is withdrawn from the reaction system. Because $CO_2$ and $H_2O$ both have substantially higher heat capacities than $N_2$, the amount of recycled flue gas that is needed as a working fluid can be significantly reduced. Additionally, using a higher heat capacity diluent can reduce laminar flame speed during combustion.

It has been discovered that using a working fluid with a higher heat capacity can mitigate one or more of the difficulties associated with handling large volumes of working fluid in the regeneration step for a reverse flow reactor. Using a higher heat capacity diluent gas can reduce the peak temperature that is produced during regeneration relative to the amount of fuel combusted. This can allow, for example, a reduction in the amount of working fluid that is used (to decrease the pressure drop across the reactor during the regeneration step) and/or an increase in the amount of fuel is used (to increase the efficiency of the subsequent reaction step).

The reduction in the volume of working fluid that is needed for heat transport can facilitate still another modification of the operation of the reverse flow reactor. By reducing the volume of working fluid, the energy requirements for compressing the working fluid can be substantially reduced. This can make it practical to operate the regeneration step for the reverse flow reactor at an elevated pressure, such as 0.7 MPa-g to 7.0 MPa-g, or 0.7 MPa-g to 15 MPa-g, or 3.4 MPa-g to 7.0 MPa-g, or 3.4 MPa-g to 15 MPa-g. High pressure gases can transfer heat within the reactor more efficiently than low pressure gases, but high pressure operation is typically avoided due to excessive costs for compressing the working fluid. However, by substantially reducing the volume of the working fluid, the cost for operating at high pressure can be mitigated while allowing the benefits of high pressure operation to be realized. Additionally, by operating at high pressure, a portion of the flue gas can be withdrawn during each cycle to form a high pressure $CO_2$-containing product gas that contains primarily $CO_2$ and $H_2O$. After removing water, this high pressure $CO_2$-containing product gas can be at or near a pressure where $CO_2$ can be used for other purposes.

Yet another modification of the operation of the reverse flow reactor can be to use a portion of reformed product as the fuel for the regeneration step. In particular, after reforming, a separation can be performed to separate $H_2$ from a remainder or tail gas product containing a majority of the CO and $CO_2$ in the reforming product. This can be accomplished, for example, by using pressure swing adsorption to separate the carbon oxides in the reforming product from $H_2$. During pressure swing adsorption, the carbon oxides can be adsorbed while $H_2$ passes through the adsorber to form an $H_2$-enriched product. $H_2$ can then be used as a sweep gas for desorption of the carbon oxides from the adsorber. The resulting tail gas from this desorption step can be used as a portion of the fuel for the regeneration step. This can allow the CO and $CO_2$ generated during reforming to also be incorporated into the flue gas.

In aspects where the tail gas from separation of the reformer product is used as a portion of the fuel for the regeneration step, still a further modification can be to control the water gas shift reaction conditions so that the tail gas is enriched in CO. Typically, when a reforming reaction is performed for generation of $H_2$, a subsequent water gas shift reaction step is performed to increase or maximize the ratio of $H_2$ to CO in the product. However, in terms of lower heating value per oxygen atom consumed during combustion, CO is a higher heat potential fuel than either $CH_4$ or $H_2$. Thus, retaining additional CO in the tail gas can reduce the amount of oxygen that is needed to generate a desired level of heat by combustion in the generator. It is noted that the combined amount of CO plus $CO_2$ in the tail gas is not changed by retaining additional CO in the tail gas. However, by reducing the amount of oxygen needed to generate a desired amount of heat, the amount of oxygen-containing gas produced by the air separation unit can be reduced. This provides an additional energy benefit, as an air separation unit typically has relatively high energy consumption per unit of oxygen-containing gas produced.

In this discussion, unless otherwise specified, description of temperatures within the reaction zone corresponds to temperatures measured at the location where the maximum temperature occurs in the reaction zone at the end of the regeneration step. The location of the maximum temperature in the reaction zone at the end of the regeneration step is typically at or near the boundary between the reaction zone and the recuperation zone. The boundary between the reaction zone and the recuperation zone is defined as the location where the catalyst for the endothermic reaction begins in the reactor.

In this discussion, unless otherwise specified, all volume ratios correspond to volume ratios where the quantities in the ratio are specified based on volume at standard temperature and pressure (20° C., 100 kPa). This allows volume ratios to be specified consistently even though two flue gas volumes being compared may exist at different temperatures and pressures. When a volume ratio is specified for flue gases being delivered into a reactor, the corresponding flow rate of gas for a unit time under standard conditions can be used for the comparison.

Modification of Regeneration Step—Input Flows and Operating Conditions for Regeneration Reverse flow reactors and/or other reactors with flows in opposite directions at different stages of a reaction cycle can be useful when performing endothermic reactions at elevated temperatures, such as temperatures of 600° C. or more, or 800° C. or more. A flow from a first direction, sometimes referred to as a combustion flow, regeneration flow, or fuel mixture, can be used to heat one or more surfaces of a reaction zone within the reactor to a desired temperature. The reagents for a desired endothermic reaction can then be passed in using a flow in the opposite direction. The heat stored within the reactor during the regeneration step is used to provide heat for the desired endothermic reaction.

One of the challenges in operating a reverse flow reactor is managing the introduction of heat during the regeneration step. Introducing a larger amount of heat into the reactor during the regeneration step can allow for an increased amount of the corresponding endothermic reaction during the reaction step. However, the amount of heat that can be introduced is constrained by the need to avoid excessive temperature spikes in localized areas. For example, performing too much combustion at a single location could result in exceeding a maximum temperature for the structural materials and/or internal components of the reactor.

In order to overcome this difficulty, a working fluid can be introduced during the regeneration step as part of the fuel mixture. The reactor can also be pressurized during regeneration to increase the amount of working fluid per unit volume. The working fluid absorbs a portion of the heat generated during combustion and carries the heat to downstream locations within the reactor (relative to the direction of flow in the regeneration step). This can allow additional heat to be introduced into the reactor while reducing the maximum temperature at any location. Thus, the input flows during regeneration of a reverse flow reactor can correspond to a combination of fuel, an oxygen-containing stream, and a working fluid. In various aspects, one or more of the fuel, the oxygen-containing stream, and the working fluid can be modified to allow for production of a high pressure $CO_2$-containing gas.

Conventionally, a substantial portion of the working fluid used in a reverse flow reactor regeneration step corresponds to nitrogen, which is a relatively low heat capacity gas. Such a working fluid can be formed by using recycled flue gas as the working fluid while also using air as the oxygen source for combustion. In such a configuration, nitrogen can correspond to 50 vol % or more of the flow into a reactor during the regeneration step, and the volume of nitrogen can potentially be as much as an order of magnitude greater (or more) than the amount fuel that is introduced to generate heat (volume basis). This large volume of working fluid can result in substantial pressure drops within a reactor, leading to substantial operating costs for compression. Larger reactor sizes could mitigate the pressure drops, but such increases in reactor size can create other processing difficulties. Additionally, increasing reactor footprint within a refinery is typically a less desirable outcome.

Instead of using air as the oxygen source for combustion, in various aspects the oxygen source for combustion can correspond to an oxygen-containing stream that contains substantially less nitrogen than air and/or more oxygen than air. For example, an oxygen-containing stream can be used that contains 30 vol % or more of oxygen, or 50 vol % or more, or 70 vol % or more, such as up to 100 vol % of oxygen. Additionally or alternatively, the nitrogen content of the oxygen-containing stream can be 30 vol % or less, or 15 vol % or less, or 10 vol % or less, or 1.0 vol % or less, such as down to having substantially no nitrogen content (0.1 vol % or less). An air separation unit can generate oxygen-containing streams that have elevated oxygen contents and/or reduced nitrogen contents.

Reducing the amount of nitrogen present in the combustion environment results in a corresponding reduction in the amount of nitrogen in the flue gas. As a result, a second modification of the regeneration step can be to use a working fluid that contains a reduced or minimized amount of nitrogen.

Because the working fluid corresponds to recycled flue gas, the combustion products from previous cycles are included in the working fluid. This means that the working fluid can include both $CO_2$ and $H_2O$. In various aspects, the working fluid can include 20 vol % or more $CO_2$, or 25 vol % or more, or 30 vol % or more, or 40 vol % or more, such as up to 100 vol %. In some aspects, the working fluid can include 20 vol % to 60 vol % $CO_2$, or 25 vol % to 60 vol %, or 30 vol % to 60 vol %, or 20 vol % to 50 vol %, or 25 vol % to 70 vol %. Optionally, the working fluid can include 10 vol % or more of $H_2O$, or 20 vol % or more, or 40 vol % or more, such as up to 70 vol % or possibly still higher. If desired, a water separation step could be included as part of a flue gas recycle loop to reduce the amount of $H_2O$ in a working fluid. In some aspects, the working fluid can include 95 vol % to 100 vol % of $CO_2$ and $H_2O$, or 98 vol % to 100 vol %. It is noted that if the working fluid corresponded entirely to the combustion products formed from stoichiometric combustion of methane, the working fluid would have a composition of roughly 33 vol % $CO_2$ and 67 vol % $H_2O$. Depending on the aspect, the working fluid can contain 15 vol % or less of $N_2$, or 10 vol % or less, or 5 vol % or less, or 2.0 vol % or less, such as down to having substantially no $N_2$ content (0.1 vol % or less). This is in contrast to a conventional configuration for reforming of hydrocarbons in a reverse flow reactor, where 40 vol % or more of the working fluid can correspond to $N_2$.

In some aspects, the fuel for the regeneration step can correspond to a conventional hydrocarbon fuel, such as methane or natural gas. In other aspects, the fuel can correspond to a mixture of a hydrocarbon fuel (such as methane) and a recycled tail gas from separation of the reforming effluent. When a recycled tail gas is included as part of the fuel, the resulting fuel mixture (fuel plus working fluid plus oxygen-containing gas) can include 2.0 vol % or more of CO, or 5.0 vol % or more, or 8.0 vol % or more, such as up to 15 vol % or possibly still higher. A tail gas for recycle can be formed, for example, by separating hydrogen from the reforming effluent using a swing adsorber.

Reducing or minimizing the nitrogen content of the input flows to the regenerator can facilitate performing regeneration at a substantially higher pressure. Conventionally, regeneration in a reverse flow reactor is performed at a pressure similar to the desired pressure for performing the corresponding endothermic reaction. When a reverse flow reactor is used for reforming, this can correspond to performing the regeneration at a pressure between 0.5 MPa-g and 3.0 MPa-g. With a conventional recycled flue gas containing substantial amounts of $N_2$, operating the regeneration at higher pressures would require an undesirable increase in compression costs. This is due to the large volumes of $N_2$ that are needed to compensate for the low heat capacity of $N_2$. In contrast to conventional operation, in various aspects the regeneration step can be performed using combustion conditions corresponding to a pressure of 0.5 MPa-g to 7.0 MPa-g, or 0.7 MPa-g to 7.0 MPa-g, or 1.4 MPa-g to 7.0 MPa-g, or 3.4 MPa-g to 7.0 MPa-g. In other aspects, higher pressure combustion conditions can be used, such as a combustion pressure of 0.7 MPa-g to 15 MPa-g, or 1.4 MPa-g to 15 MPa-g, or 3.4 MPa-g to 15 MPa-g, or 7.5 MPa-g to 15 MPa-g.

Operating the regenerator at high pressure regeneration/combustion conditions can provide several advantages. First, high pressure operation can facilitate heat transfer within the reverse flow reactor, resulting in a more evenly distributed heat profile after regeneration. Second, by forming a high pressure flue gas that contains primarily $CO_2$ and $H_2O$, a portion of the flue gas can be used as a $CO_2$ stream for sequestration or other uses after minimal additional processing.

After passing through the reactor, the flue gas from the regenerator can be compressed to return the flue gas to the pressure for use as a working fluid for regeneration. Before or after compression, a portion of the flue gas can be separated out as a $CO_2$-containing product stream. The water in the $CO_2$-containing product stream can be removed by cooling the $CO_2$-containing product stream, such as by heat exchange. In continuous flow operation, this can be performed while roughly maintaining the pressure of the $CO_2$-containing stream. This can result in a $CO_2$-containing stream with a $CO_2$ content of 80 vol % or more, or 90 vol % or more, or 95 vol % or more, such as up to containing substantially only $CO_2$ (less than 0.1 vol % of other components, or 99.9% or more $CO_2$). The $CO_2$-containing stream can then be passed into a sequestration process. Alternatively, the $CO_2$-containing stream can be used as an input for a process that uses $CO_2$, such as dry ice production or injection into a hydrocarbon extraction site. Generally, sequestration and/or use of $CO_2$ is performed at a pressure of roughly 7.0 MPa-g or more, or 14 MPa-g or more, such as up 20 MPa-g or possibly still higher. Thus, operating the regeneration step of the reverse flow reactor at an elevated pressure can allow the heat transfer benefits of high pressure operation to be realized while also producing a $CO_2$-containing stream that is at a desirable pressure for further use.

In addition to the above advantages, it has been discovered that using a higher heat capacity gas as the diluent during the regeneration step can provide an unexpected decrease in the laminar flame speed of the combustion reaction at temperatures of 600° C. or more. A higher laminar flame speed corresponds to faster combustion. Decreasing the laminar flame speed of the combustion reaction during the regeneration step can expand the distance within the reactor where the combustion reaction occurs. This spreading out of the combustion region can provide a further unexpected reduction in maximum temperature when combustion is performed at temperatures of 600° C. or more, or 700° or more, or 800° C. or more, such as up to 1500° C. or possibly still higher. In some aspects, addition of a high heat capacity gas to the diluent can reduce the laminar flame speed at temperature of 600° C. or more, or 700° C. or more, or 800° C. or more, to 100 cm/s or less, or 75 cm/s or less. It is noted that the decrease in laminar flame speed may be due in part to improved radical quenching by the higher heat capacity gas.

Processing of Reforming Effluent—Water Gas Shift and Swing Adsorption

In some aspects, one of the modifications to the fuel mixture for the regeneration step can be to modify the fuel by adding a tail gas from separation of the reforming effluent. In such aspects, the processing and separation of the reforming effluent can also be modified to provide a tail gas with an increased CO content.

Although hydrogen is often the desired output from hydrocarbon reforming, the nature of a hydrocarbon reforming reaction also results in production of carbon oxides. The carbon oxides are typically a mixture of CO and $CO_2$, with the ratio of CO to $CO_2$ being at least partially selected by subsequently exposing the reforming effluent to a water gas shift catalyst under appropriate conditions. When hydrogen is the desired output from reforming, the effluent is typically shifted to increase or maximize $H_2$ production. This also results in increased $CO_2$ production. A separation is then performed to provide a high purity $H_2$ stream and one or more remaining portions that include the $CO_2$. Because the $CO_2$ from the combustion product is dilute, it is generally not desirable to combine the additional $CO_2$ from reforming with the combustion product.

In contrast to conventional methods, in various aspects the carbon oxides from the reforming effluent can be added to the input flows for regeneration as part of a tail gas that is added to the fuel. The tail gas can be formed, for example, by separating hydrogen from the reforming effluent using swing adsorption, such as pressure swing adsorption.

After reforming, the reforming effluent can first be exposed to a water gas shift catalyst in order to modify the ratio of $H_2$ to CO in the reforming effluent. The water gas shift reaction is a fast equilibrium reaction. The stoichiometry of the water gas shift reaction is shown in Equation (1).

$$H_2O + CO \iff H_2 + CO_2 \qquad (1)$$

Generally, the water gas shift reaction can be performed at temperatures of 250° C. or more. A variety of catalysts are available that provide water gas shift reaction activity. Catalysts with reforming activity, such as nickel or rhodium based catalysts, typically also have activity for the water gas shift reaction. Other transition metals such as iron and copper can also have activity for the water gas shift reaction.

During conventional $H_2$ production, the conditions for the water gas shift reaction are typically selected to reduce the CO concentration in the reforming effluent by roughly 90%. For example, by including excess steam during reforming and/or using excess steam when exposing the reforming effluent to a water gas shift catalyst, the equilibrium can be driven toward production of $H_2$ and $CO_2$ at the expense of CO. This is typically done to maximize the amount of $H_2$ in the reforming effluent. In some aspects, such conventional water gas shift reaction conditions can be used to increase the $H_2$ content of the reforming effluent to form a shifted synthesis gas product. In such aspects, the shifted synthesis gas product can include a CO content of 5.0 vol % or less, or 3.0 vol % or less, or 1.5 vol % or less, such as down to having substantially no CO content (0.1 vol % or less). This can correspond to having an $H_2$ to CO ratio of 8:1 or more, or 10:1 or more.

In other aspects, a water gas shift reaction prior to pressure swing adsorption can be operated to reduce the concentration of CO in the shifted synthesis gas product by 40% to 80%, or 50% to 80%, or 50% to 70%. In such aspects, the CO remaining in the shifted synthesis gas product after water gas shift can be separated with $CO_2$ during swing adsorption. While this does not substantially change the net amount of carbon in the tail gas after swing adsorption, it does increase the fuel value by including a larger amount of CO. The increased amount of CO in the tail gas can allow the amount of other fuel used in the regeneration step to be reduced by a corresponding amount. In such aspects, the ratio of $H_2$ to CO in the shifted synthesis gas product can be between 4.0 and 10, or between 4.0 and 8.0.

Pressure swing adsorption (PSA) relies on swinging or cycling pressure over a bed of adsorbent through a range of values. In PSA processes, a gaseous mixture is conducted under pressure for a period of time over a first bed of a solid sorbent that is selective, or relatively selective, for one or more components, usually regarded as a contaminant, to be removed from the gaseous mixture. For example, a feed can be introduced into a PSA apparatus at a feed pressure. At the feed pressure, one or more of the components (gases) in the feed can be selectively (or relatively selectively) (ad)sorbed, while one or more other components (gases) can pass through with lower or minimal adsorption. A component (gas) that is selectively (ad)sorbed can be referred to as a "heavy" component of a feed, while a gas that is not selectively (ad)sorbed can be referred to as a "light" component of a feed. For convenience, a reference to the "heavy" component of the feed can refer to all components (gases) that are selectively (ad)sorbed, unless otherwise specified. Similarly, a reference to the "light" component can refer to all components (gases) that are not selectively (ad)sorbed, unless otherwise specified. After a period of time, the feed flow into the PSA apparatus can be stopped. The feed flow can be stopped based on a predetermined schedule, based on detection of breakthrough of one or more heavy components, based on (ad)sorption of the heavy component(s) corresponding to at least a threshold percentage of the total capacity of the (ad)sorbent, or based on any other convenient criteria. The pressure in the reactor can then be reduced to a desorption pressure that can allow the selectively (ad)sorbed component(s) (gas(es)) to be released from the (ad)sorbent. Optionally, one or more purge gases, e.g. steam, can be used prior to, during, and/or after the reduction in pressure to facilitate release of the selectively (ad)sorbed component(s) (gas(es)). Depending on its nature, a full PSA cycle can optionally be performed at a roughly constant temperature. As PSA is usually enabled by at least adsorption and usually occurs on gaseous components, the terms "adsorption"/"adsorbent" and "gas(es)" are used as descriptors in the instant specification and claims, without intending to be limiting in scope, even though "absorption"/ "absorbent"/"sorbent"/"sorption" and "component(s)" may be more generally applicable.

In various aspects, a reforming effluent can be used as the input flow for a pressure swing adsorption process. The synthesis gas can include $H_2$, $H_2O$, CO, and $CO_2$. In such aspects, $H_2O$, CO, and $CO_2$ can correspond to heavy components while $H_2$ can correspond to the light component. This can be achieved using commercially available adsorbents in the swing adsorber, such as adsorbents available from Air Products and Chemicals of Allentown, Pa. The light component ($H_2$) can pass through the adsorber as a primary product stream. The adsorbed components can be desorbed using a pressure swing process to form a tail gas containing the previously adsorbed components. Depending on the aspect, some $H_2$ can be used as part of the sweep gas during desorption to prepare the adsorbent for the next adsorption cycle. Optionally, if additional removal of CO and/or $CO_2$ is desired, supplemental adsorption of CO and/ or $CO_2$ can be performed before and/or after the pressure swing adsorption. Any components removed by supplemental adsorption can optionally be added to the tail gas from the swing adsorption process.

A full pressure swing adsorption cycle involves, at a minimum, an adsorption stage (for adsorbing one or more components from an input flow) and a desorption stage (to regenerated the adsorbent by removing the adsorbed components). In order to provide a continuous or semi-continuous output flow, a plurality of adsorbent beds can be used. The multiple beds can be used to enable a complete cycle, where typically every bed sequentially goes through the same cycle. When a first PSA reactor satisfies a condition, such as the adsorbent in the reactor becoming sufficiently saturated, the feed flow can be switched to a second reactor. The first PSA reactor can then be regenerated by having the adsorbed gases released. To allow for a continuous feed flow, a sufficient number of PSA reactors and/or adsorbent beds can be used so that the first PSA reactor is finished regenerating prior to at least one other PSA reactor satisfying the condition for switching reactors.

To perform a separation, at least a portion of the reforming effluent can be introduced into a PSA reactor. To facilitate adsorption of the heavy components, the reforming effluent can be cooled prior to introducing the effluent into the PSA reactor. Depending on the amount of cooling performed, the reforming effluent can have a temperature from 10° C. to 150° C. as it enters the PSA reactor, or 10° C. to 100° C., or 20° C. to 150° C., or 20° C. to 100° C. The pressure of the reforming effluent as it enters the PSA reactor can be 10 bar-a (~1.0 MPa-a) to 60 bar-a (~6.0 MPa-a), or 15 bar-a (~1.5 MPa-a) to 50 bar-a (~5.0 MPa-a), or 20 bar-a (~2.0 MPa-a) to 60 bar-a (~5.0 MPa-a), or 10 bar-a (~1.0 MPa-a) to 40 bar-a (~4.0 MPa-a), or 10 bar-a (~1.0 MPa-a) to 30 bar-a (~3.0 MPa-a).

The feed can be passed through the PSA reactor until one or more pre-defined criteria is satisfied for switching the feed to another PSA reactor or otherwise stopping the flow of feed gas. Any convenient pre-defined criteria can be used. For example, the feed can be passed through the reactor for a specified time period. Additionally or alternately, the feed can be passed into the reactor until a breakthrough amount of CO, $CO_2$, and/or $H_2O$ is detected in the product $H_2$ stream. Further additionally or alternately, the feed can be passed into the reactor until the amount of $CO_2$ and/or $H_2O$ that has entered the reactor is approximately equal to a threshold value of the adsorbent capacity of the reactor. In such a situation, for example, the feed can be passed into the reactor until the amount of $H_2O$ and/or $CO_2$ that has entered the reactor is equal to 75% or more of the adsorbent capacity of the adsorbent material in the reactor, or 80% or more, or 85% or more, or 90% or more, such as up to 100% or possibly still higher. A typical PSA cycle can involve introducing feed into the reactor for about 30 seconds to about 300 seconds, e.g., for about 60 seconds to about 120 seconds.

One or more purge gas flows can be used to remove the adsorbed $CO_2$, $H_2O$, and CO from the reactor. One option can include using a hydrogen-containing purge to assist with desorbing the adsorbed components.

In another aspect, the adsorbent particles can be assembled into an ordered structure such as a monolith. Conventional monolith adsorbents have their own characteristic advantages and disadvantages, one of which is that it is difficult to form a thin and reliably uniform wash coating of adsorbent on the support, especially if the monolith has pores of relatively small diameter when the coating solution may clog the pore entrances and preclude further ingress of coating material. In this case, the adsorption characteristics of the monolith are likely to be unpredictable and less than optimal. To overcome this drawback, while retaining advantages of the monolith to a certain extent, including its low tortuosity and predictable void volume, particulate adsorbents can preferably be formed into a simulated monolith by laying down a layer of the adsorbent material on the surfaces of the particles and then assembling the particles into the adsorbent bed, e.g., either by packing directly into the sorption vessel in a densely packed bed or, more preferably, by forming the coated structured adsorbent particles into shaped structures which can then be packed into the vessel in the form of blocks, similarly to blocks of monolith. In effect, the conventional method of monolith fabrication can be inverted and the adsorbent coated onto the outside of the support particles and the monolith-like structure then assembled from the coated particles. In this way, not only can a more uniform coating of the essential adsorbent be achieved but the pore structure of the simulated monolith can be controlled by using particles of different shapes and surface roughness. When operating in this manner, the adsorbent particles should have a ratio of length to maximum cross-sectional dimension ratio of at least 2:1, preferably at least 5:1, and a maximum cross-sectional dimension typically not more than 5 mm, for example not more than 1 mm. After the particles are laid down in the ordered configuration with longitudinally extensive, substantially aligned gas channels, the particles can then be bundled/adhered together in the mass to form a coherent, self-supporting body. The masses can then be placed in the vessel with the gas passages aligned in the desired orientation to form an ordered adsorbent bed. The void fraction within the adsorbent—that is, the ratio of the void volume due to porosity of solid adsorbents (including micropores and macropores) and also void volume due to gas flow channels or interstices to the volume of the vessel containing the adsorbent—should be less than 0.5, or less than 0.3.

Configuration Example

FIG. 1 shows an example of a reaction system suitable for integrating carbon capture with hydrocarbon reforming in a reaction system including reverse flow reactors. In the example shown in FIG. 1, the reaction system includes multiple reverse flow reactors. Although a total of five reactors are shown in FIG. 1, it is understood that any convenient number of reactors can be used. By using multiple reactors, a continuous or substantially continuous stream of reaction product can be provided as input to downstream parts of a refinery, chemical plant, or other facility.

In FIG. 1, the two reactors 110 correspond to reactors in the regeneration portion of the reaction cycle. The two reactors 130 correspond to reactors in the endothermic reaction (reforming) portion of the reaction cycle. For example, reactors 130 can be performing steam reforming, where an input stream 132 of steam and methane (and/or other reformable organics) is converted to a reforming effluent 135. Reactor 120 corresponds to a reactor that is in-between the regeneration and reaction portions of the cycle. Depending on the length of each portion of the cycle, reactor 120 can alternatively correspond to another reactor in the regeneration portion of the cycle or another reactor in the reaction portion of the cycle. It is understood that the representation in FIG. 1 corresponds to a snapshot of the system at a given point in time. As the reaction cycle continues, the individual reactors will progress from reaction to regeneration and back again to reaction.

During regeneration, fuel and oxidant feed mixture 102 is passed into the reactors in the regeneration step, such as reactor(s) 110. The fuel and oxidant mixture 102 can be pressurized 103 to a desired pressure prior to being passed into reactor(s) 110. In addition to fuel and oxidant feed 102, reactors in regeneration also receive flue gas as a working fluid. In the configuration shown in FIG. 1, a first portion 162 of the flue gas 115 from reactor(s) 110 is passed through a heat recovery stage, such as a waste heat boiler 160, followed by compression 163 to increase the recycled flue gas to the same pressure as fuel and oxidant feed mixture 102 prior to combining the flows. The remaining portion 165 of flue gas stream 115 is passed out of the reaction system, in order to maintain a desired level of gas within the reaction system. In the example shown in FIG. 1, the remaining portion 165 is passed into separation stage 190 to remove water. This results in a high purity, high pressure $CO_2$-containing stream 195.

In FIG. 1, the flow path corresponding to flue gas 115; the first portion 162; and the line where first portion 162 is combined with fuel mixture 102, corresponds to a recycle loop. The recycle loop provides fluid communication between the reactor inlet end of reactor(s) 110 and the regenerator inlet end of reactor(s) 110. The fluid communication is intermittent, as the fluid communication is only provided during the regeneration step. This can be managed, for example, by appropriate use of valves.

The fuel and oxidant feed mixture 102 can be formed by combining fuel with an oxygen-containing stream 172. The oxygen-containing stream 172 can be, for example, an oxygen-enriched stream produced by an air separation unit 170. Air separation unit 170 can also produce a nitrogen-containing stream 179. Nitrogen-containing stream can optionally be used as a diluent fluid or working fluid 188 for a turbine 180 to provide power. The power from turbine 180 can be used, for example, as power for air separation unit 170. The fuel can at least partially correspond to a tail gas 157 derived from separating $H_2$ from remaining components in the reforming effluent. To the degree that additional fuel is needed, any convenient type of hydrocarbon can be used, such as methane or natural gas.

In the configuration shown in FIG. 1, after exiting from the reactor(s) 130, the reforming effluent 135 is passed into a water gas shift reactor 140 to produce a shifted synthesis gas product 145. Water gas shift reactor 140 can be used to increase the molar ratio of $H_2$ to CO in the shifted synthesis gas product 145. The $H_2$ to CO molar ratio in the reforming effluent 135 is typically near 3:1. In some aspects, water gas shift reactor 140 can be used to create a shifted synthesis gas product 145 with a reduced or minimized CO content, such as having a CO content of 5.0 vol % or less, or 3.0 vol % or less, or 1.5 vol % or less, such as down to having substantially no CO content (0.1 vol % or less). This can correspond to having an $H_2$ to CO ratio of 8:1 or more, or 10:1 or more. It is noted that because oxygen-containing stream 172 is formed by an air separation unit, a reduced or minimized amount of diluent gas (such as nitrogen) is included in the shifted synthesis gas product. In other aspects, a smaller amount of CO reduction can be performed. In such aspects, the ratio of $H_2$ to CO in the shifted synthesis gas product can be between 4.0 and 10, or between 4.0 and 8.0. This can increase the fuel value of the tail gas stream 157 that is used as part of the fuel for regenerating reactor(s) 110.

The shifted synthesis gas product 145 can then be separated using one or more swing adsorption reactors 150 to produce a hydrogen-enriched stream 155 and tail gas 157.

In the example configuration shown in FIG. 1, the outlet (s) of the swing adsorption reactor(s) 150 that exhaust tail gas stream 157 can be in intermittent fluid communication with the recycle loop. Such intermittent fluid communication can be managed, for example, by appropriate use of valves.

Example of Reverse Flow Reactor Configuration

For endothermic reactions operated at elevated temperatures, such as hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A two-step process can then be used wherein heat is (a) added to the reactor bed(s) or monolith(s) via in-situ combustion, and then (b) removed from the bed in-situ via an endothermic process, such as reforming, pyrolysis, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner.

As an example, a reverse flow reactor system can include first and second reactors, oriented in a series relationship with each other with respect to a common flow path, and optionally but preferably along a common axis. The common axis may be horizontal, vertical, or otherwise. In other examples, a reverse flow reactor system can correspond to a single reactor that includes both a reaction zone and a recuperation zone. During a regeneration step, reactants (e.g., fuel and oxygen) are permitted to combine or mix in a reaction zone to combust therein, in-situ, and create a high temperature zone or heat bubble inside a middle portion of the reactor system. The heat bubble can correspond to a temperature that is at least about the initial temperature for the endothermic reaction. Typically, the temperature of the heat bubble can be greater than the initial temperature for the endothermic reaction, as the temperature will decrease as heat is transferred from the heat bubble in a middle portion of the reactor toward the ends of the reactor. In some aspects, the combining can be enhanced by a reactant mixer that mixes the reactants to facilitate substantially complete combustion/reaction at the desired location, with the mixer optionally located between the first and second reactors. The combustion process can take place over a long enough duration that the flow of first and second reactants through the first reactor also serves to displace a substantial portion, (as desired) of the heat produced by the reaction (e.g., the heat bubble), into and at least partially through the second reactor, but preferably not all of the way through the second reactor to reduce or minimize waste of heat and overheating the second reactor. This heat is transferred, for example, to one or more surfaces in the second reactor and/or in the reaction zone for the endothermic reaction in a reactor. The flue gas may be exhausted through the second reactor, but preferably most of the heat is retained within the second reactor. The amount of heat displaced into the second reactor during the regeneration step can also be limited or determined by the desired exposure time or space velocity that the hydrocarbon feed gas will have in the endothermic reaction environment. In aspects where a single reactor is used, the heat produced by the reaction can be displaced into and/or at least partially through the combustion zone of the reactor, but preferably the displacement can also reduce or minimize waste of heat due to exit of heated gas from the reactor.

After regeneration or heating the second reactor media (which can include and/or correspond to one or more surfaces including a catalyst for an endothermic reaction), in the next/reverse step or cycle, reactants for the endothermic reaction can be supplied or flowed through the second reactor, from the direction opposite the direction of flow during the heating step. For example, in a reforming process, methane (and/or natural gas and/or another hydrocarbon) can be supplied or flowed through the second reactor. The methane can contact the hot second reactor and mixer media, in the heat bubble region, to transfer the heat to the methane for reaction energy.

For some aspects, the basic two-step asymmetric cycle of a reverse flow regenerative bed reactor system is depicted in FIGS. 6A and 6B of FIG. 6 in terms of a reactor system having two zones/reactors; a first or recuperator/quenching zone (7) and a second or reaction zone (1). Both the reaction zone (1) and the recuperator zone (7) can contain regenerative monoliths and/or other regenerative structures formed from a doped ceramic composition. Regenerative monoliths or other regenerative structures, as used herein, comprise materials that are effective in storing and transferring heat as well as being effective for carrying out a chemical reaction. The regenerative monoliths and/or other structures can correspond to any convenient type of material that is suitable for storing heat, transferring heat, and catalyzing a reaction. Examples of structures can include bedding or packing material ceramic beads or spheres, ceramic honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin. In some aspects, the catalytic ceramic monolith and/or other catalytic ceramic structure can be used without the presence of an additional washcoat.

To facilitate description of FIG. 6, the reactor is described herein with reference to a reforming reaction. As shown in FIG. 6A of FIG. 6, at the beginning of the "reaction" step of the cycle, a secondary end 5 of the reaction zone 1 (a.k.a. herein as the second reactor) can be at an elevated temperature as compared to the primary end 3 of the reaction zone 1, and at least a portion (including the first end 9) of the recuperator or quench zone 7 (a.k.a. herein as the first reactor), can be at a lower temperature than the reaction zone 1 to provide a quenching effect for the resulting product. In an aspect where the reactors are used to perform reverse flow reforming, a methane-containing reactant feed (or other hydrocarbon-containing reactant feed) can be introduced via a conduit(s) 15, into a primary end 3 of the reforming or reaction zone 1. In various aspects, the hydrocarbon-containing reactant feed can also contain $H_2O$, $CO_2$, or a combination thereof.

The feed stream from inlet(s) 15 can absorb heat from reaction zone 1 and endothermically react to produce the desired synthesis gas product. As this step proceeds, a shift in the temperature profile 2, as indicated by the arrow, can be created based on the heat transfer properties of the system. When the ceramic catalyst monolith/other catalyst structure is designed with adequate heat transfer capability, this profile can have a relatively sharp temperature gradient, which gradient can move across the reaction zone 1 as the reforming step proceeds. In some aspects, a sharper temperature gradient profile can provide for improved control over reaction conditions. In aspects where another type of endothermic reaction is performed, a similar shift in temperature profile can occur, so that a temperature gradient moves across reaction zone 1 as the reaction step proceeds.

The effluent from the reforming reaction, which can include unreacted feed components (hydrocarbons, $H_2O$, $CO_2$) as well as synthesis gas components, can exit the reaction zone 1 through a secondary end 5 at an elevated temperature and pass through the recuperator reactor 7, entering through a second end 11, and exiting at a first end 9. The recuperator 7 can initially be at a lower temperature than the reaction zone 1. As the products (and optionally unreacted feed) from the reforming reaction pass through the recuperator zone 7, the gas can be quenched or cooled to a temperature approaching the temperature of the recuperator zone substantially at the first end 9, which in some embodiments can be approximately the same temperature as the regeneration feed introduced via conduit 19 into the recuperator 7 during the second step of the cycle. As the reforming effluent is cooled in the recuperator zone 7, a temperature gradient 4 can be created in the zone's regenerative bed(s) and can move across the recuperator zone 7 during this step. The quenching can heat the recuperator 7, which can be cooled again in the second step to later provide another quenching service and to prevent the size and location of the heat bubble from growing progressively through the quench reactor 7. After quenching, the reaction gas can exit the recuperator at 9 via conduit 17 and can be processed for separation and recovery of the various components.

The second step of the cycle, referred to as the regeneration step, can then begin with reintroduction of the first and second regeneration reactants via conduit(s) 19. The first and second reactants can pass separately through hot recuperator 7 toward the second end 11 of the recuperator 7, where they can be combined for exothermic reaction or combustion in or near a central region 13 of the reactor system.

An example of the regeneration step is illustrated in FIG. 6B of FIG. 6. Regeneration can entail transferring recovered sensible heat from the recuperator zone 7 to the reaction zone 1 to thermally regenerate the reaction beds 1 for the subsequent reaction cycle. Regeneration gas/reactants can enter recuperator zone 7, such as via conduit(s) 19, and flow through the recuperator zone 7 and into the reaction zone 1. In doing so, the temperature gradients 6 and 8 may move across the beds as illustrated by the arrows on the exemplary graphs in FIG. 6B, similar to but in opposite directions to the graphs of the temperature gradients developed during the reaction cycle in FIG. 6A of FIG. 6. Fuel and oxidant reactants may combust at a region proximate to the interface 13 of the recuperator zone 7 and the reaction zone 1. The heat recovered from the recuperator zone together with the heat of combustion can be transferred to the reaction zone, thermally regenerating the regenerative reaction monoliths and/or beds 1 disposed therein.

In some aspects, several of the conduits within a channel may convey a mixture of first and second reactants, due at least in part to some mixing at the first end (17) of the first reactor. However, the numbers of conduits conveying combustible mixtures of first and second reactants can be sufficiently low such that the majority of the stoichiometrically reactable reactants will not react until after exiting the second end of the first reactor. The axial location of initiation of combustion or exothermic reaction within those conduits conveying a mixture of reactants can be controlled by a combination of temperature, time, and fluid dynamics. Fuel and oxygen usually require a temperature-dependent and mixture-dependent autoignition time to combust. Still though, some reaction may occur within an axial portion of the conduits conveying a mixture of reactants. However, this reaction can be acceptable because the number of channels having such reaction can be sufficiently small that there is only an acceptable or inconsequential level of effect upon the overall heat balance within the reactor. The design details of a particular reactor system can be selected so as to avoid mixing of reactants within the conduits as much as reasonably possible.

Figure 7:
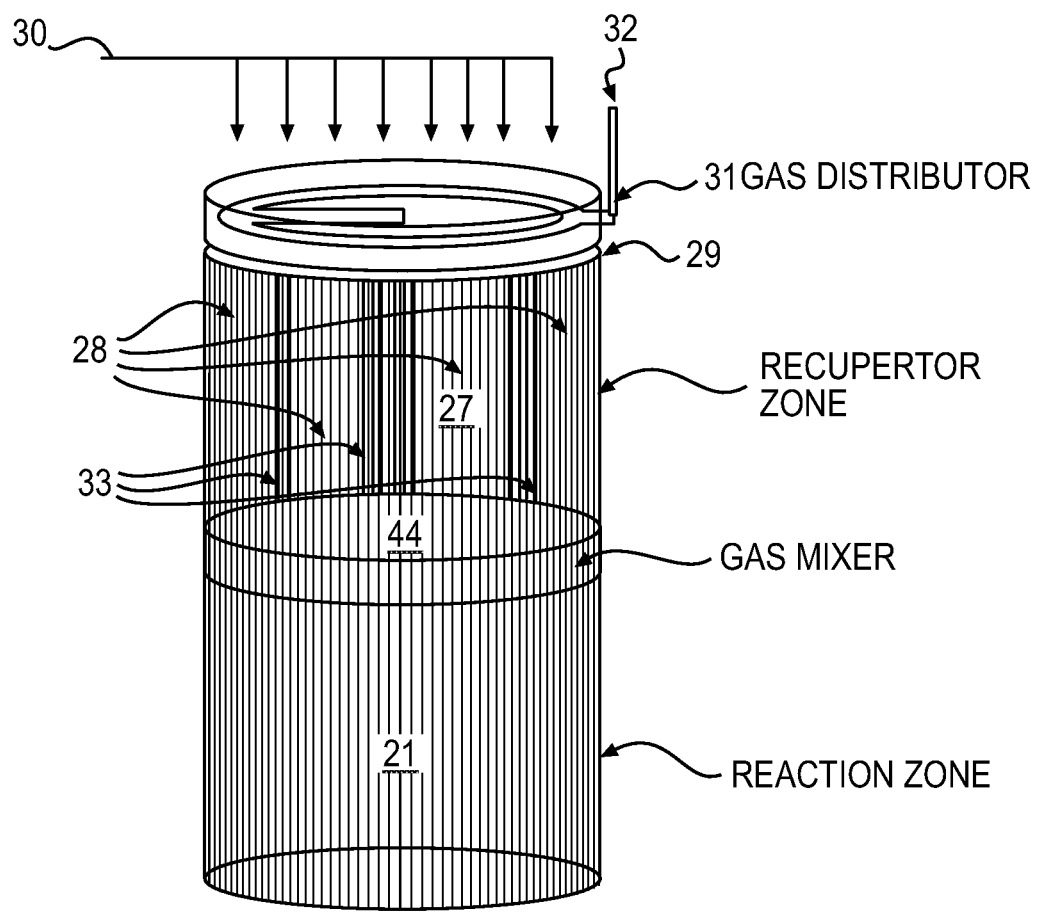
FIG. 7 schematically shows an example of a reverse flow reactor.

FIG. 7 illustrates another exemplary reactor system that may be suitable in some applications for controlling and deferring the combustion of fuel and oxidant to achieve efficient regeneration heat. FIG. 7 depicts a single reactor system, operating in the regeneration cycle. The reactor system may be considered as comprising two reactor zones. The recuperator 27 can be the zone primarily where quenching takes place and provides substantially isolated flow paths or channels for transferring both of the quenching reaction gases through the reactor media, without incurring combustion until the gasses arrive proximate or within the reactor core 13 in FIG. 6. The reformer 2 can be the reactor where regeneration heating and methane (and/or hydrocarbon) reformation primarily occurs, and may be considered as the second reactor for purposes herein. Although the first and second reactors in the reactor system are identified as separately distinguishable reactors, it is understood that the first and second reactors may be manufactured, provided, or otherwise combined into a common single reactor bed, whereby the reactor system might be described as comprising merely a single reactor that integrates both cycles within the reactor. The terms "first reactor" and "second reactor" can merely refer to the respective zones within the reactor system whereby each of the regeneration, reformation, quenching, etc., steps take place and do not require that separate components be utilized for the two reactors. However, various aspects can comprise a reactor system whereby the recuperator reactor includes conduits and channels as described herein, and the reformer reactor may similarly possess conduits. Additionally or alternately, some aspects may include a reformer reactor bed that is arranged different from and may even include different materials from, the recuperator reactor bed.

As discussed previously, the first reactor or recuperator 27 can include various gas conduits 28 for separately channeling two or more gases following entry into a first end 29 of the recuperator 27 and through the regenerative bed(s) disposed therein. A first gas 30 can enter a first end of a plurality of flow conduits 28. In addition to providing a flow channel, the conduits 28 can also comprise effective flow barriers (e.g., which effectively function such as conduit walls) to prevent cross flow or mixing between the first and second reactants and maintain a majority of the reactants effectively separated from each other until mixing is permitted. As discussed previously, each of the first and second channels can comprise multiple channels or flow paths. The first reactor may also comprise multiple substantially parallel flow segments, each comprising segregated first and second channels.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that at the interface between channels, a number of conduits may convey a mixture of first and second reactant, but this number of conduits is proportionately small.

In aspects where a monolith is used, the monolith can have any convenient shape suitable for use as a catalytic surface. An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- or three-dimensionally stacking such blocks above, behind, and beside each other. Monoliths can be attractive as reactor internal structures because they provide high heat transfer capacity with minimum pressure drop.

In some aspects, honeycomb monoliths can be characterized as having open frontal area (or geometric void volume) between 25% and 55%, and having conduit density between 50 and 2000 pores or cells per square inch (CPSI), or between 100 and 900 cells per square inch, or between 100 cells per square inch to 600 cells per square inch. For example, in one embodiment, the conduits may have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 ft$^{-1}$ to 3000 ft$^{-1}$ (~0.16 km$^{-1}$ to ~10 km$^{-1}$), or from 100 ft$^{-1}$ to 2500 ft$^{-1}$ (~0.32 km$^{-1}$ to ~8.2 km$^{-1}$), or from 200 ft$^{-1}$ to 2000 ft$^{-1}$ (~0.65 km$^{-1}$ to ~6.5 km$^{-1}$), based upon the volume of the first reactor that is used to convey a reactant. These relatively high surface area per unit volume values can aid in achieving a relatively quick change in the temperature through the reactor, such as generally illustrated by the relatively steep slopes in the exemplary temperature gradient profile graphs shown in FIG. 12(a) or 12(b) of FIG. 6.

Reactor media components can also provide for channels that include a packing that includes a high volumetric heat transfer coefficient (e.g., 0.02 cal/cm$^3$s° C. or more, or 0.05 cal/cm$^3$s° C. or more, or 0.10 cal/cal/cm$^3$s° C. or more); that have low resistance to flow (low pressure drop); that have an operating temperature range consistent with the highest temperatures encountered during regeneration; that have high resistance to thermal shock; and/or that have high bulk heat capacity (e.g., 0.10 cal/cm$^3$s° C. or more, or 0.20 cal/cm$^3$s° C. or more). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 12(a) and 12(b) of FIG. 6. The cited values are averages based upon the volume of reactor used for conveyance of a reactant.

In various aspects, adequate heat transfer rate can be characterized by a heat transfer parameter, ΔTHT, below 500° C., or below 100° C., or below 50° C. The parameter ΔTHT, as used herein, is the ratio of the bed-average volumetric heat transfer rate that is needed for recuperation, to the volumetric heat transfer coefficient of the bed, hv. The volumetric heat transfer rate (e.g. cal/cm$^3$ sec) that is sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. cm³) of the reactor (or portion of a reactor) traversed by the gas. The volumetric heat transfer coefficient of the bed, hv, can typically be calculated as the product of an area-based coefficient (e.g. cal/cm²s° C.) and a specific surface area for heat transfer (av, e.g. cm²/cm³), often referred to as the wetted area of the packing.

In some aspects, a washcoat can be added to the formed, sintered ceramic composition. A washcoat can allow the sintered ceramic composition to be impregnated with additional catalytic metal.

One option for incorporating an additional catalytic metal into a washcoat can be to impregnate a catalyst support with the additional catalytic metal, such as by impregnation via incipient wetness. The impregnation can be performed with an aqueous solution of suitable metal salt or other catalytic metal precursor, such as tetramineplatinum nitrate or rhodium nitrate hydrate. The impregnated support can then be dried and/or calcined for decomposition of the catalytic metal precursor. A variety of temperature profiles can potentially be used for the heating steps. One or more initial drying steps can be used for drying the support, such as heating at a temperature from 100° C. to 200° C. for 0.5 hours to 24 hours. A calcination to decompose the catalytic metal precursor compound can be at a temperature of 200° C. to 800° C. for 0.5 hours to 24 hours, depending on the nature of the impregnated catalytic metal compound. Depending on the precursor for the catalytic metal, the drying step(s) and/or the decomposing calcination step(s) can be optional. Examples of additional catalytic metals can include, but are not limited to, Ni, Co, Fe, Pd, Rh, Ru, Pt, Ir, Cu, Ag, Au, Zr, Cr, Ti, V, and combinations thereof.

Alternative embodiments may use reactor media other than monoliths, such as whereby the channel conduits/flow paths may include a more tortuous pathways (e.g. convoluted, complex, winding and/or twisted but not linear or tubular), including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator 27. Such other types of reactor media can be suitable, so long as at least a portion of such media can be formed by sintering a ceramic catalytic composition as described herein, followed by exposing such media to reducing conditions to activate the catalyst. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

In some aspects, the reverse flow reactor can include some type of equipment or method to direct a flow stream of one of the reactants into a selected portion of the conduits. In the exemplary embodiment of FIG. 7, a gas distributor 31 can direct a second gas stream 32 to second gas stream channels that are substantially isolated from or not in fluid communication with the first gas channels, here illustrated as channels 33. The result can be that at least a portion of gas stream 33 is kept separate from gas stream 30 during axial transit of the recuperator 27. In some aspects, the regenerative bed(s) and/or monolith(s) of the recuperator zone can comprise channels having a gas or fluid barrier that isolates the first reactant channels from the second reactant channels. Thereby, both of the at least two reactant gases that transit the channel means may fully transit the regenerative bed(s), to quench the regenerative bed, absorb heat into the reactant gases, before combining to react with each other in the combustion zone.

In various aspects, gases (including fluids) 30 and 32 can each comprise a component that reacts with a component in the other reactant 30 and 32, to produce an exothermic reaction when combined. For example, each of the first and second reactant may comprise one of a fuel gas and an oxidant gas that combust or burn when combined with the other of the fuel and oxidant. By keeping the reactants substantially separated, the location of the heat release that occurs due to exothermic reaction can be controlled. In some aspects "substantially separated" can be defined to mean that at least 50 percent, or at least 75 percent, or at least 90 percent of the reactant having the smallest or limiting stoichiometrically reactable amount of reactant, as between the first and second reactant streams, has not become consumed by reaction by the point at which these gases have completed their axial transit of the recuperator 27. In this manner, the majority of the first reactant 30 can be kept isolated from the majority of the second reactant 32, and the majority of the heat release from the reaction of combining reactants 30 and 32 can take place after the reactants begin exiting the recuperator 27. The reactants can be gases, but optionally some reactants may comprise a liquid, mixture, or vapor phase.

The percent reaction for these regeneration streams is meant the percent of reaction that is possible based on the stoichiometry of the overall feed. For example, if gas 30 comprised 100 volumes of air (80 volumes $N_2$ and 20 volumes $O_2$), and gas 32 comprised 10 volumes of hydrogen, then the maximum stoichiometric reaction would be the combustion of 10 volumes of hydrogen ($H_2$) with 5 volumes of oxygen ($O_2$) to make 10 volumes of $H_2O$. In this case, if 10 volumes of hydrogen were actually combusted in the recuperator zone (27), this would represent 100% reaction of the regeneration stream. This is despite the presence of residual un-reacted oxygen, because in this example the un-reacted oxygen was present in amounts above the stoichiometric requirement. Thus, in this example the hydrogen is the stoichiometrically limiting component. Using this definition, less than 50% reaction, or less than 25% reaction, or less than 10% reaction of the regeneration streams can occur during the axial transit of the recuperator (27).

In various aspects, channels 28 and 33 can comprise ceramic (including zirconia), alumina, or other refractory material capable of withstanding temperatures exceeding 1200° C., or 1400° C., or 1600° C. Additionally or alternately, channels 28 and 33 can have a wetted area between 50 $ft^{-1}$ and 3000 $ft^{-1}$, or between 100 $ft^{-1}$ and 2500 $ft^{-1}$, or between 200 $ft^{-1}$ and 2000 $ft^{-1}$.

Referring again briefly to FIG. 6, the reactor system can include a first reactor 7 containing a first end 9 and a second end 11, and a second reactor 1 containing a primary end 3 and a secondary end 5. The embodiments illustrated in FIGS. 6 and 7 are merely simple illustrations provided for explanatory purposes only and are not intended to represent a comprehensive embodiment. Reference made to an "end"

of a reactor merely refers to a distal portion of the reactor with respect to an axial mid-point of the reactor. Thus, to say that a gas enters or exits an "end" of the reactor, such as end 9, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other is supplied to that respective end of the reactor through slots or ports in the circumferential or perimeter outer surface on the respective end of the reactor.

Process Example—Reverse Flow Reforming and Regeneration

An example of a reaction that can be performed in a reverse flow reactor system is reforming of hydrocarbons under steam reforming conditions in the presence of $H_2O$, under dry reforming conditions in the presence of $CO_2$, or under conditions where both $H_2O$ and $CO_2$ are present in the reaction environment. As a general overview of operation during reforming in a swing reactor, such as a reverse flow reactor, a regeneration step or portion of a reaction cycle can be used to provide heat for the reactor. Reforming can then occur within the reactor during a reforming step or portion of the cycle, with the reforming reaction consuming heat provided during the reactor regeneration step. During reactor regeneration, fuel, an oxidant, and a diluent are introduced into the reactor from a regeneration end of the reactor. The bed and/or monoliths in the regeneration section of the reactor can absorb heat, but at least a portion of the regeneration section typically does not include a catalyst for reforming. As the fuel and oxidant pass through the regeneration section, heat is transferred from the regeneration section to the fuel and oxidant. Combustion does not occur immediately, but instead the location of combustion is controlled to occur in a middle portion of the reactor. The flow of the fuel, oxidant, and diluent continues during the regeneration step, leading to additional transfer of the heat generated from combustion into the reaction zone/the reforming end of the reactor.

After a sufficient period of time, the combustion reaction is stopped. Any remaining combustion products and/or reactants can optionally be purged. The reforming step or portion of the reaction cycle can then start. The reactants for reforming can be introduced into the reforming end of the reactor, and thus flow in effectively the opposite direction relative to the flow during regeneration. The bed and/or monoliths in the reforming portion of the reactor can include a catalyst for reforming. In various aspects, at least a portion of the catalyst can correspond to a catalyst formed from a ceramic composition as described herein. As reforming occurs, the heat introduced into the reforming zone during combustion can be consumed by the endothermic reforming reaction. After exiting the reforming zone, the reforming products (and unreacted reactants) are no longer exposed to a reforming catalyst. As the reforming products pass through the regeneration zone, heat can be transferred from the products to the regeneration zone. After a sufficient period of time, the reforming process can be stopped, remaining reforming products can optionally be collected or purged from the reactor, and the cycle can start again with a regeneration step.

The reforming reaction performed within the reactor can correspond reforming of methane and/or other hydrocarbons using steam reforming, in the presence of $H_2O$; using dry reforming, in the presence of $CO_2$, or using "bi" reforming in the presence of both $H_2O$ and $CO_2$. Examples of stoichiometry for steam, dry, and "bi" reforming of methane are shown in equations (2)-(4).

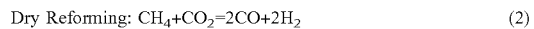

Dry Reforming: $CH_4+CO_2=2CO+2H_2$     (2)

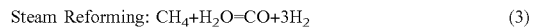

Steam Reforming: $CH_4+H_2O=CO+3H_2$     (3)

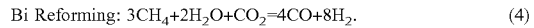

Bi Reforming: $3CH_4+2H_2O+CO_2=4CO+8H_2$.     (4)

As shown in equations (2)-(4), dry reforming can produce lower ratios of $H_2$ to CO than steam reforming. Reforming reactions performed with only steam can generally produce a ratio of $H_2$ to CO of around 3, such as 2.5 to 3.5. By contrast, reforming reactions performed in the presence of $CO_2$ can generate much lower ratios, possibly approaching a ratio of $H_2$ to CO of roughly 1.0 or even lower. By using a combination of $CO_2$ and $H_2O$ during reforming, the reforming reaction can potentially be controlled to generate a wide variety of $H_2$ to CO ratios in a resulting syngas.

It is noted that the ratio of $H_2$ to CO in a synthesis gas can also be dependent on the water gas shift equilibrium. Although the above stoichiometry shows ratios of roughly 1 or roughly 3 for dry reforming and steam reforming, respectively, the equilibrium amounts of $H_2$ and CO in a synthesis gas can be different from the reaction stoichiometry. The equilibrium amounts can be determined based on the water gas shift equilibrium.

Most reforming catalysts, such as rhodium and/or nickel, can also serve as water gas shift catalysts. Thus, if reaction environment for producing $H_2$ and CO also includes $H_2O$ and/or $CO_2$, the initial stoichiometry from the reforming reaction may be altered based on the water gas shift equilibrium. This equilibrium is also temperature dependent, with higher temperatures favoring production of CO and $H_2O$. It is noted that higher temperatures can also improve the rate for reaching equilibrium. As a result, the ability to perform a reforming reaction at elevated temperatures can potentially provide several benefits. For example, instead of performing steam reforming in an environment with excess $H_2O$, $CO_2$ can be added to the reaction environment. This can allow for both a reduction in the ratio of $H_2$ to CO produced based on the dry reforming stoichiometry as well as a reduction in the ratio of $H_2$ to CO produced based on the water gas shift equilibrium. Alternatively, if a higher $H_2$ to CO ratio is desired, $CO_2$ can be removed from the environment, and the ratio of $H_2O$ to $CH_4$ (or other hydrocarbons) can be controlled to produce a desirable type of synthesis gas. This can potentially allow for generation of a synthesis gas having a $H_2$ to CO ratio of 0.1 to 15, or 0.1 to 3.0, or 0.5 to 5.0, or 1.0 to 10, by selecting appropriate amounts of feed components.

The reforming reactions shown in equations (2)-(4) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or minimized. The reforming step can consume heat, which can reduce the temperature of the reforming zone. As the products from reforming pass through the reactor, the reforming products can pass through a second zone that lacks a reforming or water gas shift catalyst. This can allow the reaction products to cool prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impurities, such as $H_2S$ and nitrogen. More generally, the hydrocarbon feed for reforming can include any convenient combination of methane and/or other hydrocarbons. Optionally, the reforming feed may also include some hydrocarbonaceous compounds, such as alcohols or mercaptans, which are similar to hydrocarbons but include one or more heteroatoms different from carbon and hydrogen. In some aspects, an additional component present in the feed can correspond to impurities such as sulfur that can adsorb to the catalytic monolith during a reducing cycle (such as a reforming cycle). Such impurities can be oxidized in a subsequent cycle to form sulfur oxide, which can then be reduced to release additional sulfur-containing components (or other impurity-containing components) into the reaction environment.

In some aspects, the feed for reforming can include, relative to a total weight of hydrocarbons in the feed for reforming, 5 wt % or more of $C_{2+}$ compounds, such as ethane or propane, or 10 wt % or more, or 15 wt % or more, or 20 wt % or more, such as up to 50 wt % or possibly still higher. It is noted that nitrogen and/or other gases that are non-reactive in a combustion environment, such as $H_2O$ and $CO_2$, may also be present in the feed for reforming. In aspects where the reformer corresponds to an on-board reforming environment, such non-reactive products can optionally be introduced into the feed, for example, based on recycle of an exhaust gas into the reformer. Additionally or alternately, the feed for reforming can include 40 wt % or more methane, or 60 wt % or more, or 80 wt % or more, or 95 wt % or more, such as having a feed that is substantially composed of methane (98 wt % or more). In aspects where the reforming corresponds to steam reforming, a molar ratio of steam molecules to carbon atoms in the feed can be 0.3 to 4.0. It is noted that methane has 1 carbon atom per molecule while ethane has 2 carbon atoms per molecule. In aspects where the reforming corresponds to dry reforming, a molar ratio of $CO_2$ molecules to carbon atoms in the feed can be 0.05 to 3.0.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion is initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. It is noted that the location of combustion catalyst within the reactor(s) can overlap with the location of reforming catalyst within the reactor(s), so that some portions of the reactor(s) can correspond to both combustion zone and reaction zone. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone. As the reforming feed moves through the reforming zone, the reactants in the feed can be consumed, which can reduce the amount of reforming that occurs at downstream locations. However, the increase in the temperature of the reforming zone as the reactants move across the reforming zone can lead to an increased reaction rate.

At roughly 500° C., the reaction rate for reforming can be sufficiently reduced that little or no additional reforming will occur. As a result, in some aspects as the reforming reaction progresses, the beginning portion of the reforming zone can cool sufficiently to effectively stop the reforming reaction within a portion of the reforming zone. This can move the location within the reactor where reforming begins to a location that is further downstream relative to the beginning of the reforming zone. When a sufficient portion of the reforming zone has a temperature below 500° C., or below 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) is roughly in balance with the amount of heat added during regeneration. After the reforming process is stopped, any remaining synthesis gas product still in the reactor can optionally be recovered prior to starting the regeneration step of the reaction cycle.

The regeneration process can then be initiated. During regeneration, a fuel such as methane, natural gas, or $H_2$, and oxygen can be introduced into the reactor and combusted. The location where the fuel and oxidant are allowed to mix can be controlled in any convenient manner, such as by introducing the fuel and oxidant via separate channels. By delaying combustion during regeneration until the reactants reach a central portion of the reactor, the non-reforming end of the reactor can be maintained at a cooler temperature. This can also result in a temperature peak in a middle portion of the reactor. The temperature peak can be located within a portion of the reactor that also includes the reforming catalyst. During a regeneration cycle, the temperature within the reforming reactor can be increased sufficiently to allow for the reforming during the reforming portion of the cycle. This can result in a peak temperature within the reactor of 1100° C. or more, or 1200° C. or more, or 1300° C. or more, or potentially a still higher temperature.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, H₂O, and/or CO₂ during the reforming step, an endothermic heat demand for the reforming reaction can be determined. This heat demand can then be used to calculate a flow rate for combustion reactants during the regeneration step. Of course, in other aspects the balance of heat between reforming and regeneration can be determined in other manners, such as by determining desired flow rates for the reactants and then selecting cycle lengths so that the heat provided by regeneration balances with the heat consumed during reforming.

In addition to providing heat, the reactor regeneration step during a reaction cycle can also allow for coke removal from the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO or CO₂. This coke can potentially block access to the catalytic sites (such as metal sites) of the catalyst. In some aspects, the rate of formation can be increased in portions of the reforming zone that are exposed to higher temperatures, such as portions of the reforming zone that are exposed to temperatures of 800° C. or more, or 900° C. or more, or 1000° C. or more. During a regeneration step, oxygen can be present as the temperature of the reforming zone is increased. At the temperatures achieved during regeneration, at least a portion of the coke generated during reforming can be removed as CO or CO₂.

Due to the variation in temperature across the reactor, several options can be used for characterizing the temperature within the reactor and/or within the reforming zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the reforming zone, an average (bed or monolith) temperature within the reforming zone can be defined based on an average of the temperature at the beginning of the reforming zone and a temperature at the end of the reforming zone. Another option can be to characterize the peak temperature within the reforming zone after a regeneration step in the reaction cycle. Generally, the peak temperature can occur at or near the end of the reforming zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from 400° C. to 1200° (or more); a peak temperature within the reforming zone of 800° C. to 1500° C.; a temperature difference at the location of peak temperature between the end of a regeneration step and the end of the subsequent reforming step of 25° C. or more, or 50° C. or more, or 100° C. or more, or 200° C. or more, such as up to 800° C. or possibly still higher; a temperature difference at the entrance to the reforming zone between the end of a regeneration step and the end of the subsequent reforming step of 25° C. or more, or 50° C. or more, or 100° C. or more, or 200° C. or more, such as up to 800° C. or possibly still higher; and/or a temperature difference at the exit from the reforming zone between the end of a regeneration step and the end of the subsequent reforming step of 25° C. or more, or 50° C. or more, or 100° C. or more, or 200° C. or more, such as up to 800° C. or possibly still higher.

With regard to the average reforming zone temperature, in various aspects the average temperature for the reforming zone can be 500° C. to 1500° C., or 400° C. to 1200° C., or 800° C. to 1200° C., or 400° C. to 900° C., or 600° C. to 1100° C., or 500° C. to 1000° C. Additionally or alternately, with regard to the peak temperature for the reforming zone (likely corresponding to a location in the reforming zone close to the location for combustion of regeneration reactants), the peak temperature can be 800° C. to 1500° C., or 1000° C. to 1400° C., or 1200° C. to 1500° C., or 1200° C. to 1400° C.

Additionally or alternately, the reaction conditions for reforming hydrocarbons can include a pressure of 0 psig to 1500 psig (10.3 MPa), or 0 psig to 1000 psig (6.9 MPa), or 0 psig to 550 psig (3.8 MPa); and a gas hourly space velocity of reforming reactants of 1000 hr⁻¹ to 50,000 hr⁻¹. The space velocity corresponds to the volume of reactants relative to the volume of monolith per unit time. The volume of the monolith is defined as the volume of the monolith as if it was a solid cylinder.

In some aspects, an advantage of operating the reforming reaction at elevated temperature can be the ability to convert substantially all of the methane and/or other hydrocarbons in a reforming feed. For example, for a reforming process where water is present in the reforming reaction environment (i.e., steam reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %

In other aspects, for a reforming process where carbon dioxide is present in the reforming reaction environment (i.e., dry reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %.

In some alternative aspects, the reforming reaction can be performed under dry reforming conditions, where the reforming is performed with CO₂ as a reagent but with a reduced or minimized amount of H₂O in the reaction environment. In such alternative aspects, a goal of the reforming reaction can be to produce a synthesis gas with a H₂ to CO ratio of 1.0 or less. In some aspects, the temperature during reforming can correspond to the temperature ranges described for steam reforming. Optionally, in some aspects a dry reforming reaction can be performed at a lower temperature of between 500° C. to 700° C., or 500° C. to 600° C. In such aspects, the ratio of $H_2$ to CO can be 0.3 to 1.0, or 0.3 to 0.7, or 0.5 to 1.0. Performing the dry reforming reaction under these conditions can also lead to substantial coke production, which can require removal during regeneration in order to maintain catalytic activity.

Example 1—Laminar Flame Speeds at Elevated Temperature

Figure 2:
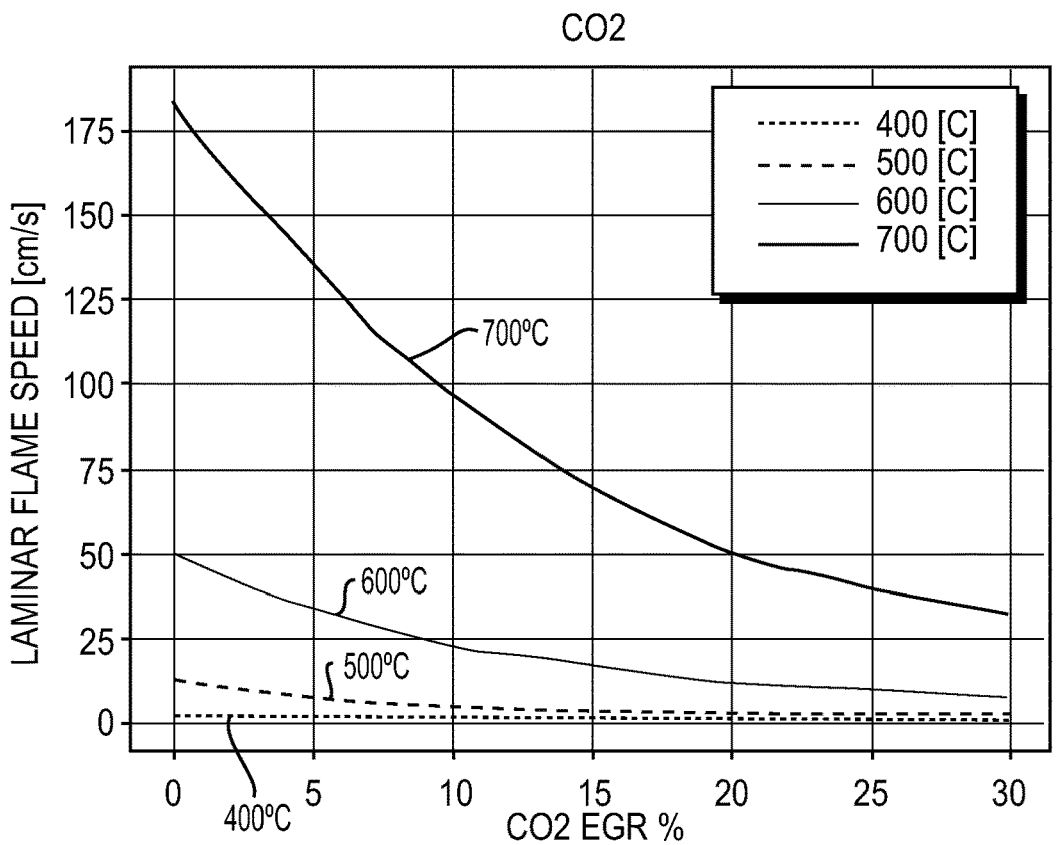
FIG. 2 shows flame speed with various amounts of $CO_2$ in the diluent gas during combustion.

A combustion model was used to determine the how the laminar flame speed changes based on changes in the composition of a diluent gas during combustion. In the modeled combustion reactions, a gas flow of $H_2$, $O_2$, and diluent was combusted. The amount of fuel corresponding to roughly 10% of the total gas flow. In a first set of tests, combustion was modeled at temperatures of 400° C., 500° C., 600° C., and 700° C. while using diluents that had various amounts of $CO_2$. FIG. 2 shows the flame speeds from the modeled combustion reactions. As shown in FIG. 2, at temperatures of 500° C. or less, the nature of the diluent gas had little or no impact on flame speed. However, at temperatures of 600° C. or more, the diluent gas corresponding to 100 vol % $N_2$ shows a substantial increase in flame speed. As $CO_2$ is blended into the diluent, the increase in flame speed is reduced, with unexpectedly large reductions in flame speed for $CO_2$ amounts of 10 vol % or more in the diluent. At 25 vol % or 30 vol % $CO_2$, the flame speed at 600° C. or more is reduced almost to the flame speed values at 500° C. or less.

It is noted that the model results for flame speed shown in FIG. 2 correspond to the flame speed for the combustion of $H_2$. The combustion of $H_2$ will result in production of $H_2O$. Any impact on the flame speed due to the $H_2O$ produced by combustion is therefore incorporated into the model results.

Figure 3:
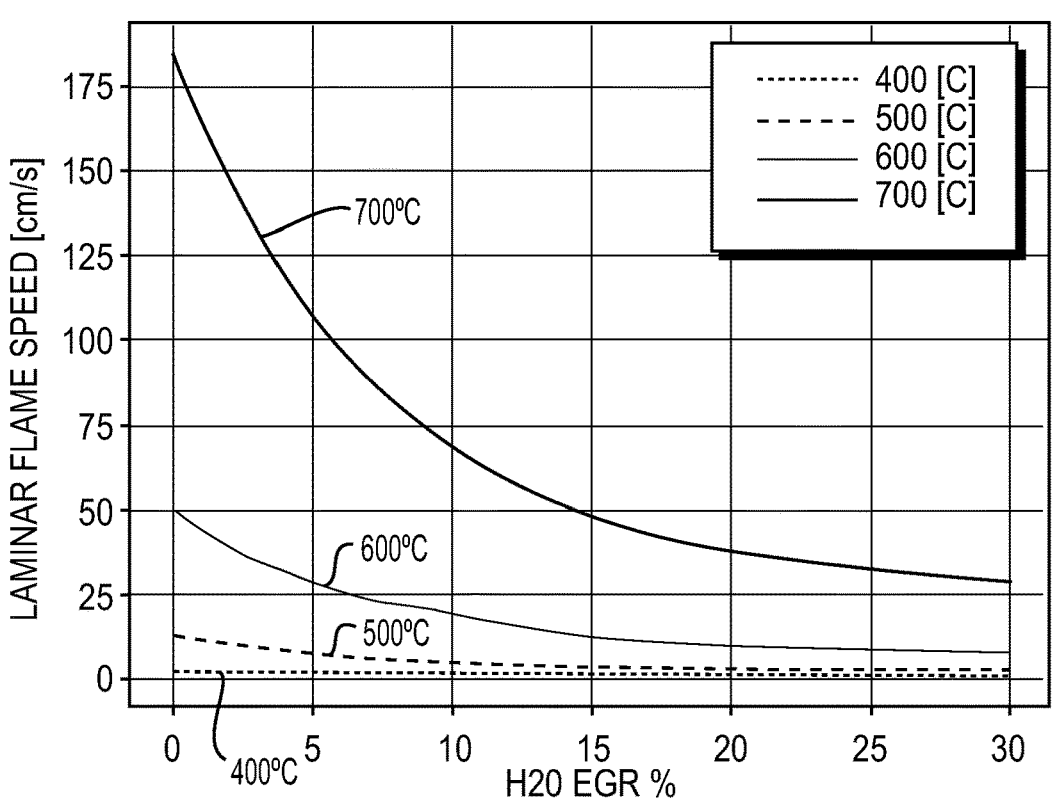
FIG. 3 shows flame speed with various amounts of $H_2O$ in the diluent gas during combustion.

FIG. 3 shows a similar set of modeling results for inclusion of varying amounts of $H_2O$ in the diluent. As shown in FIG. 3, the flame speed curves for $H_2O$ are similar to the flame speed curves for $CO_2$. Thus, even though the heat capacities of $H_2O$ and $CO_2$ differ by more than 10%, the flame speed reduction is similar for both. At 700° C. it appears that addition of $H_2O$ provides a slightly greater reduction in flame speed than $CO_2$.

Example 2—Regeneration Diluent Including 30% High Heat Capacity Gas

A pilot scale reactor (length of ~12 inches/~30 cm) was used to investigate the impact and benefits of modifying flue gas exit temperatures on operation of a reverse flow reactor system. The examples provided herein correspond to results from a single reactor, but those of skill in the art will readily understand the application of the following results to reaction systems including plurality of reverse flow reactors.

The pilot reactor was used to perform steam reforming in a reverse flow reactor using various types of diluent gases. The steam reforming was performed at a methane feed rate of 2 scf/min. The flow rate during the regeneration step was roughly 18 scf/min (~510 liters/min). This included roughly 16.1 scf/min (~455 liters/min) of diluent and 1.9 scf/min (~55 liters/min) of $H_2$ as a fuel The pressure in the reactor for both the reaction step and the regeneration step was 150 psig (~1000 kPa-g).

Figure 4A:
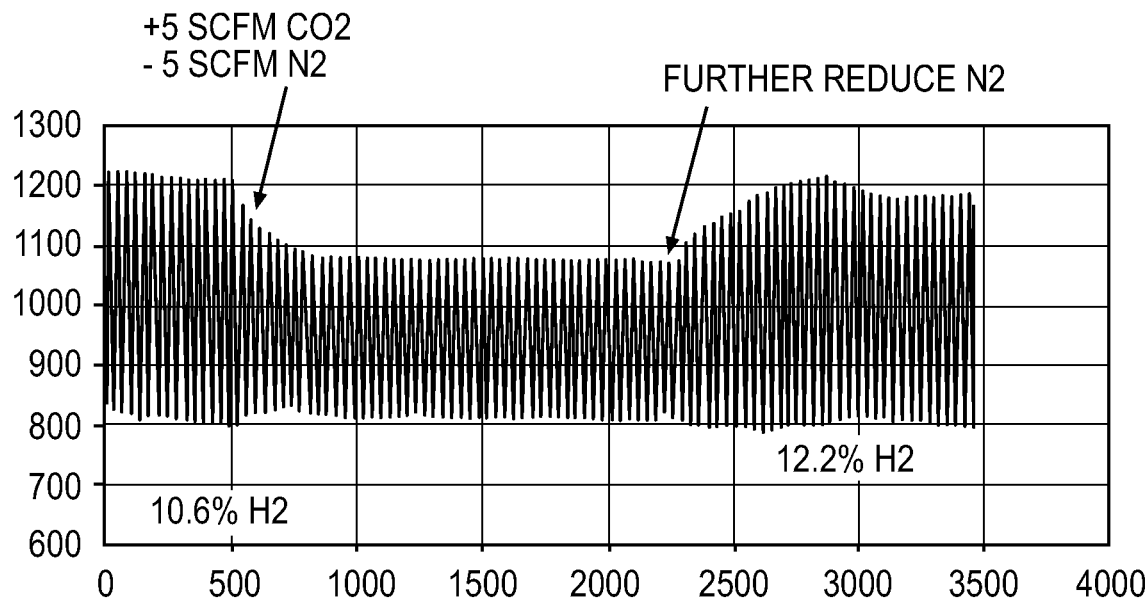
FIG. 4A shows how the composition of the fuel and diluent changed over time during the regeneration steps in the reactor.

FIG. 4A shows how the composition of the fuel and diluent changed over time during the regeneration steps in the reactor. Initially, 10.6 vol % of the flow into the reactor during regeneration corresponded to $H_2$ as a fuel. During the initial period, $N_2$ was used as substantially the entire diluent, although some smaller amounts of other gases typically present in air were included due to using air to provide the oxidant for the combustion reaction. These other gases corresponded to less than 15 vol % of the diluent.

Figure 4B:
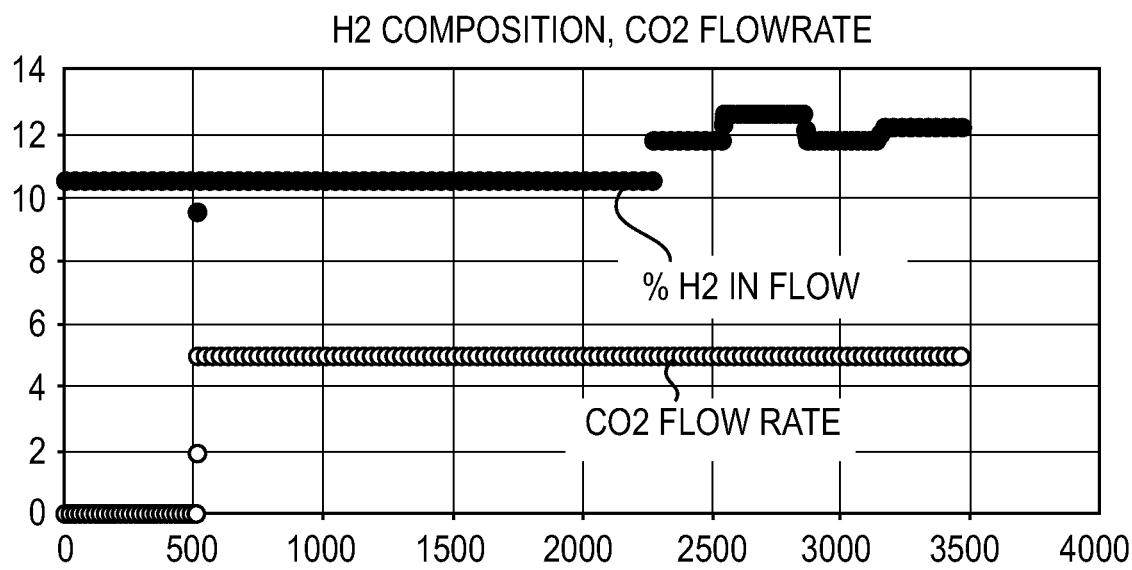
FIG. 4B shows the temperature at this location as a function of time.

In order to characterize the reactor, the temperature was sampled at 4 inches (~10 cm) from the end of the reactor where the regeneration gases enter. This location roughly corresponds to the location of the maximum in the temperature profile within the reactor. FIG. 4B shows the temperature at this location as a function of time. As shown in FIG. 4B, the temperature at the measured location reactor during the initial period was slightly greater than 1200° C. FIG. 4B also shows that the temperature cycled between a maximum of roughly 1220° C. at the end of the regeneration step and a minimum of roughly 800° C. at the end of the methane reforming step. This represents a temperature differential between the regeneration step and the reaction step of roughly 420° C.

After roughly 500 seconds of operation, FIG. 4A shows that 5.0 standard cubic feet per minute (~140 liters/min) of the $N_2$ diluent was replaced with 5.0 standard cubic feet per minute (~140 liters/min) of $CO_2$. This corresponded to replacing roughly 30 vol % of the diluent with $CO_2$. The temperature, pressure, and volume of the other input flows were kept the same. As shown in FIG. 4B, this resulted in a decrease of the maximum temperature from greater than 1200° C. to less than 1100° C. Next, fuel composition is increased to bring peak temperatures back up to greater than 1200 C. In this way, higher fuel compositions were used to create the same temperature profile within the reactor. This is achieved by reducing total diluent by roughly 15%. Although the regeneration volumetric flow during regeneration decreased, the amount of reforming performed during the reaction step remained substantially the same. This demonstrates that $CO_2$ can be used to replace $N_2$ as diluent to reduce regeneration volumetric flows within the reactor while still achieving similar reactivity. The reactor was operated under these conditions for roughly 2000 seconds to confirm that the reduced operating temperature could be maintained while also maintaining the same or a similar level of activity during the reaction step.

At 2500 seconds, additional $N_2$ was removed from the diluent. Instead of replacing the $N_2$ with other diluent, FIG. 4A shows that the amount of $H_2$ was increased from 10.6 vol % of the input flow to roughly 12.2 vol %. This increase in the amount of fuel represents a process intensification, as the additional heat generated during regeneration allowed additional reforming to be performed during the reaction step. As shown in FIG. 4B, this increased the maximum temperature in the reactor back to a temperature of slightly more than 1200° C. Thus, replacing roughly 10 vol % of the diluent during regeneration with $CO_2$ allowed for an increase in the amount of fuel used during regeneration of ~1.5 vol % (or an increase of ~15% relative to the starting amount), thus allowing for conversion of additional methane to $H_2$ during the reaction step.

Figure 5:
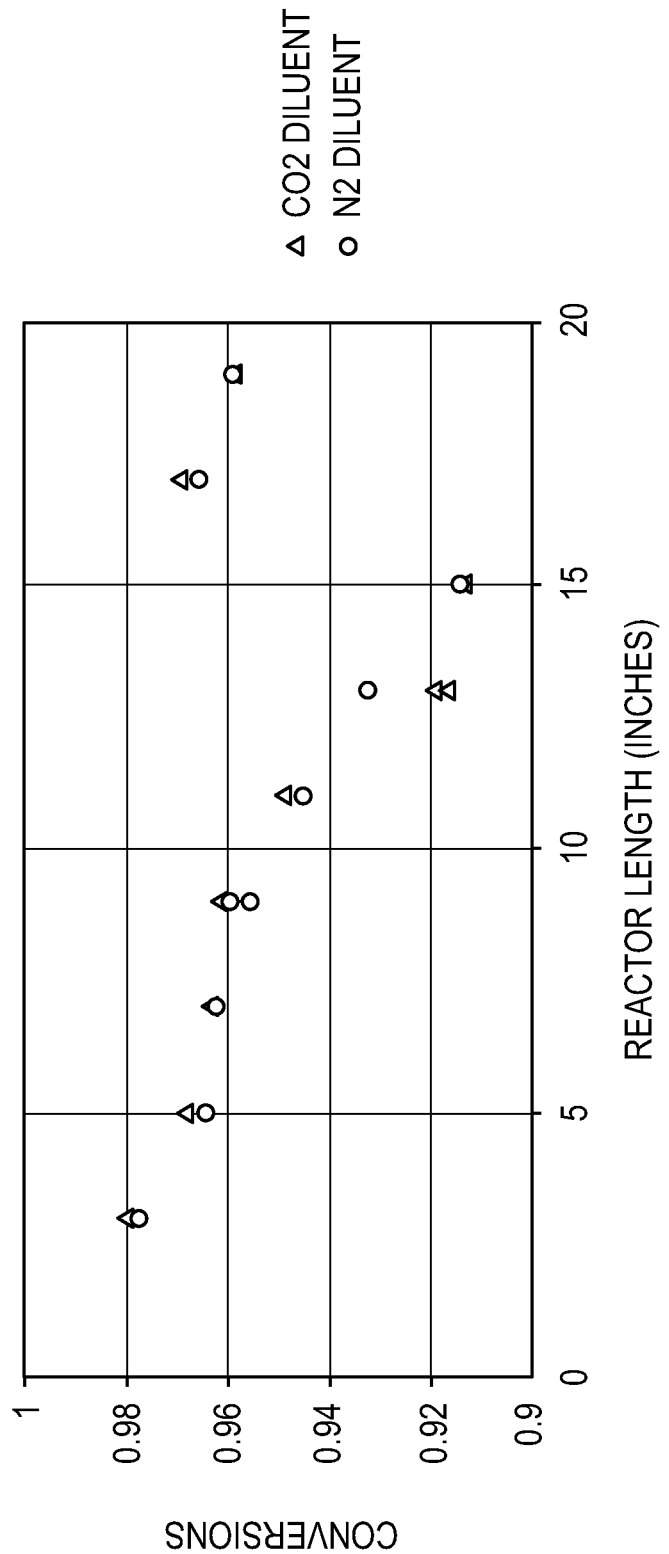
FIG. 5 shows methane conversion versus cycle time during steam reforming in a reverse flow reactor with different diluent gas compositions during regeneration.

FIG. 5 shows methane conversion versus cycle time for reforming performed under conditions similar to the conditions in FIG. 4A and FIG. 4B. As shown in FIG. 5, modifying the diluent to include 30 vol % $CO_2$ resulted in substantially the same conversion as operating the regeneration step with only $N_2$ as the diluent.

Example 3—Thermal Efficiency

To illustrate the benefits of operating a reverse flow reactor at high pressure with reduced volume of working fluid, thermal efficiency calculations were performed to determine a thermal efficiency for performing methane reforming with carbon sequestration. A first configuration corresponded to operating reverse flow reactors at an elevated regeneration pressure with a high heat capacity working fluid, similar to the configuration shown in FIG. 1. This resulted in a high pressure $CO_2$-containing stream that required only a minimal amount of additional processing to produce a high pressure, high purity $CO_2$ product. A second configuration corresponded to performing conventional steam methane reforming, with a conventional amine plant for capture of 90% of the $CO_2$ from the fuel used for providing heat for the reforming reaction. The captured $CO_2$ was then compressed to generate a stream comparable to the high pressure $CO_2$-containing stream generated by the configuration shown in FIG. 1.

The thermal efficiency (LHV basis) was calculated to understand how much energy is required to produce hydrogen with $CO_2$ capture (after compression to 2000 psig for sequestration). An Aspen Plus process model was constructed for this purpose. Any electrical work required in the system was assumed to be produced from burning methane and converting to electricity at a 55% thermal efficiency. For the process model, thermal efficiency was defined by Equation 5:

$$TE(\%) = \frac{N_{H2,product} H_{H2,LHV}}{N_{CH4,feed} H_{CH4,LHV} + W_{ele}/0.55} \times 100 \quad (5)$$

In Equation (5), TE is the percentage thermal efficiency of a configuration. $N_{H2,product}$ is the molar flow of $H_2$ generated by the system in moles per second. $H_{H2,LHV}$ is the molar heat of combustion of the $H_2$ produced by the system expressed as a lower heating value in kJ/mol. $N_{CH4,feed}$ is the molar flow of methane input to the configuration in moles per second. It is noted that this includes methane used as both feed for reforming and methane used as fuel. $H_{CH4,LHV}$ is the molar heat of combustion of the $CH_4$ expressed as a lower heating value in kJ/mol. $W_{ele}$ is the amount of electric work required for any additional processes, such as compression or amine capture of $CO_2$.

The configuration shown in FIG. 1 resulted in a 77% thermal efficiency. The comparative configuration based on steam methane reforming with amine capture of $CO_2$ followed by compression resulted in only 67% thermal efficiency. It is noted that without amine capture of $CO_2$ and subsequent compression of the $CO_2$, the thermal efficiency of steam methane reforming is typically 72%-75%. Thus, the addition of amine capture of $CO_2$ and subsequent compression results in a debit of 5% to 8% for the thermal efficiency. By contrast, reforming in a reverse flow reactor under conventional conditions and without amine capture of $CO_2$ and subsequent $CO_2$ compression typically has a thermal efficiency of 77% to 81%. Thus, by modifying the operation of a reverse flow reactor to perform reforming at elevated pressure and with an air separation unit (i.e., with an oxygen-containing gas containing little or no $N_2$), the capture and compression of $CO_2$ in the reverse flow reactor systems described herein was achieved with a reduced or minimized loss in thermal efficiency.

Additional Embodiments

Embodiment 1

A method for performing reforming, comprising: reacting a fuel mixture comprising a fuel stream, an oxygen-containing stream comprising 15 vol % or less $N_2$ relative to a volume of the oxygen-containing stream, and a recycle stream under combustion conditions comprising a combustion pressure of 0.7 MPa-g or more in a combustion zone within a reactor to form a flue gas and to heat one or more surfaces in a reaction zone to a regenerated surface temperature of 600° C. or more, the reaction zone comprising a catalyst composition, the fuel mixture comprising 0.1 vol % or more 02 and 20 vol % or more $CO_2$ relative to a volume of the fuel mixture; separating the flue gas to form at least a $CO_2$-containing stream comprising a second pressure of 0.7 MPa-g or more and the recycle stream; and exposing a hydrocarbon-containing stream to the catalyst composition in the reaction zone at the regenerated surface temperature under reforming conditions to form a reforming product stream comprising $H_2$ and CO, a direction of flow for the hydrocarbon-containing stream within the reaction zone being reversed relative to a direction of flow for the fuel mixture.

Embodiment 2

The method of Embodiment 1, wherein the combustion conditions comprise a combustion pressure of 1.4 MPa-g or more; or wherein the second pressure is 1.4 MPa-g or more; or a combination thereof.

Embodiment 3

The method of any of the above embodiments, wherein the combustion conditions comprise a combustion pressure of 3.4 MPa-g or more; or wherein the second pressure is 3.4 MPa-g or more; or a combination thereof.

Embodiment 4

The method of any of the above embodiments, further comprising compressing the flue gas prior to separating the flue gas to form at least the $CO_2$-containing stream and the recycle stream.

Embodiment 5

The method of any of the above embodiments, further comprising: exposing the reforming product stream to water gas shift reaction conditions to form a shifted synthesis gas product stream; and separating the shifted synthesis gas product stream to form a $H_2$-containing stream and a stream comprising $CO_2$, the shifted synthesis gas stream optionally comprising a molar ratio of $H_2$ to CO of less than 10.

Embodiment 6

The method of Embodiment 5, wherein the shifted synthesis gas product stream is separated by pressure swing adsorption, wherein the stream comprising $CO_2$ comprises a tail gas comprising 5.0 vol % or more of CO relative to a volume of the stream comprising $CO_2$, and wherein the fuel mixture comprises at least a portion of the stream comprising $CO_2$.

Embodiment 7

The method of any of the above embodiments, a) wherein at least one of the recycle stream and the fuel stream comprises 15 vol % or less of $N_2$; orb) wherein the method further comprises separating air in an air separation unit to form the oxygen-containing stream; or c) a combination of a) and b).

Embodiment 8

The method of any of the above embodiments, wherein the fuel stream, the oxygen-containing stream, and the recycle stream are combined to form the fuel mixture prior to entering the reactor, or wherein the fuel stream, the oxygen-containing stream, and the recycle stream are combined to form the fuel mixture prior to entering the combustion zone, or a combination thereof.

Embodiment 9

The method of any of the above embodiments, wherein the recycle stream comprises 25 vol % or more $CO_2$.

Embodiment 10

The method of any of the above embodiments, wherein the fuel mixture comprises 2.0 vol % or more of CO.

Embodiment 11

The method of any of the above embodiments, wherein the regenerated surface temperature is 800° C. or more.

Embodiment 12

The method of any of the above embodiments, further comprising separating the $CO_2$-containing stream to form a stream containing water and a $CO_2$-enriched stream comprising a $CO_2$-content of 80 vol % or more; and compressing the $CO_2$-enriched stream to a pressure of 7.0 MPa-g or more relative to a pressure of the $CO_2$-enriched stream.

Embodiment 13

The method of any of the above embodiments, wherein the combustion conditions comprise a laminar flame speed of 100 cm/s or less.

Embodiment 14

A reverse flow reactor system comprising: a reactor comprising a reactor inlet end, a regenerator inlet end, and a reaction zone comprising reforming catalyst; a recycle loop providing intermittent fluid communication between the reactor inlet end and the regenerator inlet, the recycle loop comprising a recycle compressor, a fuel source inlet, an oxygen-containing gas inlet, and a CO-containing gas outlet; an air separation unit in fluid communication with the oxygen-containing gas inlet; and a water separation stage in fluid communication with the $CO_2$-containing gas outlet.

Embodiment 15

The reverse flow reactor system of Embodiment 14, further comprising: a pressure swing adsorption separator comprising an adsorber inlet, a product outlet, and a tail gas outlet, the regenerator inlet end being in intermittent fluid communication with the adsorber inlet, the tail gas outlet being in intermittent fluid communication with the recycle loop.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for performing reforming, comprising:
reacting a fuel mixture comprising a fuel stream, an oxygen-containing stream comprising 15 vol % or less $N_2$ relative to a volume of the oxygen-containing stream, and a recycle stream under combustion conditions comprising a combustion pressure of 0.7 MPa-g or more in a combustion zone within a reactor to form a flue gas and to heat one or more surfaces in a reaction zone to a regenerated surface temperature of 600° C. or more, the reaction zone comprising a catalyst composition, the fuel mixture comprising 0.1 vol % or more 02 and 20 vol % or more $CO_2$ relative to a volume of the fuel mixture;
separating the flue gas to form at least a $CO_2$-containing stream comprising a second pressure of 0.7 MPa-g or more and the recycle stream; and
exposing a hydrocarbon-containing stream to the catalyst composition in the reaction zone at the regenerated surface temperature under reforming conditions to form a reforming product stream comprising $H_2$ and CO, a direction of flow for the hydrocarbon-containing stream within the reaction zone being reversed relative to a direction of flow for the fuel mixture.

2. The method of claim 1, wherein the combustion conditions comprise a combustion pressure of 1.4 Mpa-g or more, or wherein the second pressure is 1.4 MPa-g or more, or a combination thereof.

3. The method of claim 1, wherein the combustion conditions comprise a combustion pressure of 3.4 Mpa-g or more, or wherein the second pressure is 3.4 MPa-g or more, or a combination thereof.

4. The method of claim 1, wherein at least one of the recycle stream and the fuel mixture comprises 15 vol % or less of $N_2$.

5. The method of claim 1, further comprising compressing the flue gas prior to separating the flue gas to form at least the $CO_2$-containing stream and the recycle stream.

6. The method of claim 1, further comprising: separating the $CO_2$-containing stream to form a stream containing water and a $CO_2$-enriched stream comprising a $CO_2$-content of 80 vol % or more relative to a volume of the $CO_2$-enriched stream; and compressing the $CO_2$-enriched stream to a pressure of 7.0 MPa-g or more.

7. The method of claim 1, further comprising:
exposing the reforming product stream to water gas shift reaction conditions to form a shifted synthesis gas product stream; and
separating the shifted synthesis gas product stream to form a Hz-containing stream and a stream comprising $CO_2$.

8. The method of claim 7, wherein the shifted synthesis gas product stream is separated by pressure swing adsorption, and wherein the stream comprising $CO_2$ comprises a tail gas.

9. The method of claim 8, wherein the fuel mixture comprises at least a portion of the stream comprising $CO_2$, the stream comprising $CO_2$ further comprising 5.0 vol % or more of CO relative to a volume of the stream comprising $CO_2$.

10. The method of claim 7, wherein the shifted synthesis gas stream comprises a molar ratio of $H_2$ to CO of less than 10.

11. The method of claim 1, further comprising separating air in an air separation unit to form the oxygen-containing stream.

12. The method of claim 1, wherein the fuel stream, the oxygen-containing stream, and the recycle stream are combined to form the fuel mixture prior to entering the reactor, or wherein the fuel stream, the oxygen-containing stream, and the recycle stream are combined to form the fuel mixture prior to entering the combustion zone, or a combination thereof.

13. The method of claim 1, wherein the recycle stream comprises 25 vol % or more $CO_2$ relative to a volume of the recycle stream.

14. The method of claim 1, wherein the fuel mixture comprises 2.0 vol % or more of CO.

15. The method of claim 1, wherein the regenerated surface temperature is 800° C. or more.

16. The method of claim 1, wherein the combustion conditions comprise a laminar flame speed of 100 cm/s or less.

17. The method of claim 1, wherein the reactor comprises a reverse flow reactor.

18. The method of claim 1, wherein the reactor comprises a reactor system, the reactor system comprising a recuperator portion and a portion including the reaction zone.

* * * * *